(12) United States Patent (10) Patent No.: US 10,514,491 B2
Inoue (45) Date of Patent: Dec. 24, 2019

(54) BACKLIGHT DEVICE, AND DISPLAY DEVICE PROVIDED WITH SAME

(71) Applicant: SHARP KABUSHIKI KAISHA, Sakai, Osaka (JP)

(72) Inventor: Naoto Inoue, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/341,203

(22) PCT Filed: Oct. 4, 2017

(86) PCT No.: PCT/JP2017/036084
§ 371 (c)(1),
(2) Date: Apr. 11, 2019

(87) PCT Pub. No.: WO2018/083935
PCT Pub. Date: May 11, 2018

(65) Prior Publication Data
US 2019/0317271 A1 Oct. 17, 2019

(30) Foreign Application Priority Data

Nov. 1, 2016 (JP) ................. 2016-214246

(51) Int. Cl.
F21V 8/00 (2006.01)
H05B 33/08 (2006.01)
G02F 1/1335 (2006.01)

(52) U.S. Cl.
CPC ........... *G02B 6/0083* (2013.01); *G02B 6/009* (2013.01); *G02B 6/0068* (2013.01);
(Continued)

(58) Field of Classification Search
CPC ...... H05B 33/0803–083; G02B 6/0083; G02B 6/0068; G02B 6/0073; G02F 1/133615; G09G 3/342; G09G 3/3426
See application file for complete search history.

(56) References Cited

U.S. PATENT DOCUMENTS 7,850,358 B2 * 12/2010 Hamada ............... G02B 6/0068
362/225
2006/0221636 A1 * 10/2006 Ohashi ................. G02B 6/0068
362/612
(Continued)

FOREIGN PATENT DOCUMENTS

JP 2004-029370 A 1/2004
JP 2008-058367 A 3/2008
(Continued)

Primary Examiner — Mariceli Santiago
(74) Attorney, Agent, or Firm — ScienBiziP, P.C.

(57) ABSTRACT

In an edge-light type backlight device having a configuration in which an LED mounting board with four LEDs (1(1) to 1(4)) placed thereon is disposed on one end side of a display unit and an LED mounting board with four LEDs (1(5)-1(8)) placed thereon is disposed on the other end side of the display unit, a cathode terminal of an LED (1(4)) disposed most downstream on the LED mounting board disposed on the one end side of the display unit and an anode terminal of the LED (1(5)) disposed most upstream on the LED mounting board disposed on the other side end of the display unit are connected through wiring on an LED drive board. All of the LEDs (1(1) to 1(8)) are driven by only one DC-DC converter (11).

14 Claims, 22 Drawing Sheets

(52) U.S. Cl.
CPC ..... *G02B 6/0073* (2013.01); *G02F 1/133615* (2013.01); *H05B 33/083* (2013.01); *H05B 33/0815* (2013.01)

(56) References Cited

U.S. PATENT DOCUMENTS

2011/0080432 A1* 4/2011 Nakazawa ........... G09G 3/3426
　　　　　　　　　　　　　　　　　　　　345/690
2017/0004778 A1* 1/2017 Kang ................ H05B 33/0827

FOREIGN PATENT DOCUMENTS

| | | |
|---|---|---|
| JP | 2009-205964 A | 9/2009 |
| JP | 2009-290245 A | 12/2009 |
| JP | 2010-044399 A | 2/2010 |
| JP | 2012-033514 A | 2/2012 |

* cited by examiner

BACKLIGHT DEVICE, AND DISPLAY DEVICE PROVIDED WITH SAME

TECHNICAL FIELD

The following disclosure relates to a backlight device, and more specifically, relates to an edge-light type backlight device capable of performing a local dimming process and a display device provided with the backlight device.

BACKGROUND ART

In a transmissive liquid crystal display device, in order to display an image, a backlight device that applies light from the back surface of a display unit (liquid crystal panel) is required. Conventionally, cold cathode tubes called CCFLs have been widely adopted as a light source of the backlight device. However, in recent years, light emitting diodes (LEDs) have been increasingly adopted from the viewpoint of low power consumption and the ease of luminance control.

Focusing on the structure, the backlight device is mainly classified into a so-called "direct type" in which the light source is disposed on the back surface of the display unit and a so-called "edge-light type" in which the light source is disposed at the side edge portion of the display unit. According to the direct type backlight device using an LED as the light source, it is possible to increase the luminance by arranging a large number of LEDs on the back surface of the display unit and to perform a finer local dimming process (described later). On the other hand, according to the edge-light type backlight device using the LED as the light source, it is possible to reduce the thickness and to reduce the power consumption due to the smaller number of LEDs used compared to the direct type.

In recent years, in order to reduce the power consumption, there has been developed a liquid crystal display device that performs the local dimming process in which a screen is logically divided into a plurality of areas and the luminance (light emission intensity) of the light source (typically, LED) is controlled for each area. In the local dimming process, the luminance of the light source is controlled based on an input image in the corresponding area. Specifically, the luminance of each light source is obtained based on the maximum value, an average value, or the like, of target luminance (luminance corresponding to the input tone value) of pixels included in the corresponding area. In an area where the luminance of the light source is made smaller than the original luminance, the transmittance of each pixel is increased. As a result, targeted display luminance can be obtained in each pixel. Further, in recent years, HDR drive for displaying an extremely wide dynamic range has been developed actively. The local dimming process is used also at the time of achieving this HDR driving.

Three conventional examples concerning the circuit configuration of the edge-light type backlight device (the configuration of the backlight drive circuit) will be described. In the following first to third conventional examples, it is assumed that four LEDs 91(1) to 91(4) are provided as light sources on one end side (e.g., upper end side) of the display unit. In any of the following first to third conventional examples, as shown in FIG. 31, four LEDs 91(1) to 91(4) are arranged side by side on an LED mounting board 910 provided on one end side of the display unit. In the following description, when it is unnecessary to distinguish the four LEDs 91(1) to 91(4) from each other, the LED is simply denoted by numeral 91. The same applies to other constituent elements.

FIG. 32 is a circuit diagram showing the configuration of the backlight drive circuit in the first conventional example. Note that the configuration of the first conventional example is a configuration that can be adopted in a display device in which the local dimming process is not performed. The backlight drive circuit shown in FIG. 32 is constituted by four LEDs 91(1) to 91(4), a DC-DC converter 901, a DC-DC control unit 902, a FET 905, and a sense resistor 906. The four LEDs 91(1) to 91(4) are connected in series. An anode terminal of: the LED 91(1) disposed most upstream is connected to an output terminal of the DC-DC converter 901, and a cathode terminal of the LED 91(4) disposed most downstream is connected to a drain terminal of the FET 905.

Based on the control by the DC-DC control unit 902, the DC-DC converter 901 converts an input direct-current voltage (input voltage DCDC_VIN) into a direct-current voltage (output voltage DCDC_VOUT) necessary for causing all of the LEDs 91(1) to 91(4) to emit light with desired luminance. Based on a voltage obtained by the sense resistor 906, the DC-DC control unit. 902 controls on/off of switches (e.g., switch on the high side and a switch on the low side) in the DC-DC converter 901 so that the output voltage DCDC_VOUT has a desired magnitude. In addition, the DC-DC control unit 902 controls a gate voltage of the FET 905 based on the voltage obtained by the sense resistor 906 so that a constant current is supplied to the LEDs 91(1) to 91(4). As thus described, the constant current drive circuit is achieved by the FET 905, the sense resistor 906, and a part of the DC-DC control unit 902.

With the configuration and operation as described above, even when there occurs a change in a forward voltage due to a change in temperature or the like in each of the LEDs 91(1) to 91(4), a constant current is supplied to the LEDs 91(1) to 91(4), and hence the LEDs 91(1) to 91(4) emit light with constant luminance.

According to the first conventional example, all of the LEDs 91(1) to 91(4) emit light with same luminance. Therefore, the configuration of the first conventional example cannot be adopted in the display device on which the local dimming process is performed.

FIG. 33 is a circuit diagram showing the configuration of the backlight drive circuit in the second conventional example. Note that the configuration of the second conventional example is a configuration that can be adopted in a display device on which the local dimming process is performed. The backlight drive circuit shown in FIG. 33 is constituted by four LEDs 91(1) to 91(4) corresponding to four areas, respectively, four FETs 915(1) to 915(4) corresponding to the four LEDs 91(1) to 91(4), respectively, four sense resistors 916(1) to 916(4) corresponding to the four LEDs 91(1) to LED 91(4), respectively, a DC-DC converter 901, a DC-DC control unit 902, a switch control unit 904, an FET 905, and a sense resistor 906. In the second conventional example, unlike the first conventional example, the four LEDs 91(1) to 91(4) are connected in parallel. Then, the switch control unit 904 controls the gate voltages of the four FETs 915(1) to 915(4) based on the voltages obtained by the four sense resistors 916(1) to 916(4), respectively, so that the four LEDs 91(1) to 91(4) emit light with desired luminance.

As understood from FIG. 33, according to the second conventional example, a constant current drive circuit constituted by the FET 915, the sense resistor 916, and a part of the switch control unit 904 is required in number equal to the number of areas. In addition, there is a concern that a voltage loss at the FET 915 and the sense resistor 916 increases and the driving efficiency of the LED deteriorates. Therefore, the configuration of the third conventional example described below has been proposed.

FIG. 34 is a circuit diagram showing the configuration of the backlight drive circuit in the third conventional example. The backlight drive circuit shown in FIG. 34 is constituted by four LEDs 91(1) to 91(4) corresponding to four areas, respectively, four switches 903(1) to 903(4) corresponding to the four LEDs 91(1) to 91(4), respectively, a DC-DC converter 901, a DC-DC control unit 902, a switch control unit 904, an FET 905, and a sense resistor 906. As understood from FIG. 34, the four LEDs 91(1) to 91(4) are connected in series. Further, each switch 903 is connected in parallel with the corresponding LED 91.

In the above configuration on, the switch control unit 14 controls on/off of the four switches 903(1) to 903(4). Thus, the supply of the current to each LED 91 is controlled, and the luminance is adjusted for each LED 91.

According to the third conventional example, unlike the second conventional example, the number of constant current drive circuits is not necessarily equal to the number of areas. Thus, at the time of performing the local dimming process, favorable driving efficiency can be obtained as compared to the second conventional example.

PRIOR ART DOCUMENTS

Patent Documents

[Patent Document 1] Japanese Laid-Open Patent Publication No. 2008-58367
[Patent Document 2] Japanese Laid-Open Patent Publication No. 2012-33514
[Patent Document 3] Japanese Laid-Open Patent Publication No. 2004-29370
[Patent Document 4] Japanese Laid-Open Patent Publication. No. 2010-44399
[Patent Document 5] Japanese Laid-Open Patent Publication No. 2009-290245
[Patent Document 6] Japanese Laid-Open Patent Publication No. 2009-205964

SUMMARY OF THE INVENTION

Problems to be Solved by the Invention

As described above, with respect to the edge-light type backlight device capable of performing the local dimming process, conventionally, the configuration in which the switch is provided in parallel with each LED (see FIG. 34) has been adopted so as to obtain favorable driving efficiency for the LEDs. However, in the case of adopting the configuration in which a plurality of LEDs are provided on one end side and the other end side of the display unit as the edge-light type backlight device, when the third conventional example is applied, two circuits as shown in FIG. 34 are provided. That is, two systems of DC-DC converters 901 are required. While the DC-DC converter 901 includes a coil, the coil is an element having a large size among the circuit elements. Therefore, when the two systems of DC-DC converters 901 are provided, the circuit size remarkably increases. For this reason, it is difficult to realize reduction in size, thickness, and weight of display devices, which has been strongly required in recent years.

Further, according to the configuration shown in FIG. 34, the switches 903 for controlling the supply of the current to the LED 91 are required in number equal to the number of the LEDs 91. The switches 903 are placed on an LED drive board or a system board. As a result, the board area increases. From this point of view as well, it has been difficult to realize reduction in size, thickness, and weight of the device.

Therefore, in the following disclosure, an object is to realize reduction in size, thickness, and weight as compared to the conventional one, concerning an edge-light type backlight device capable of performing a local dimming process and a display device provided with the backlight device.

Means for Solving the Problems

A first aspect of the present invention is directed to an edge-light type backlight device, including:
a light guide plate;
a first LED group that is a plurality of LEDs connected in series;
a second LED group that is a plurality of LEDs connected in series;
switches each being connected in parallel with a corresponding LED;
a first LED mounting board which is disposed on one end side of the light guide plate and on which the first LED group is placed;
a second LED mounting board disposed on the other end side of the light guide plate and on which the second LED group is placed; and
an LED drive board on which a circuit for driving the first LED group and the second LED group is formed;
wherein
control of supply of a current to each of the LEDs is performed by controlling on/off of a corresponding switch, and
a cathode terminal of a LED disposed most downstream in the first TED group and an anode terminal of a LED disposed most upstream of the second LED group are electrically connected to each other through wiring on the LED drive board.

According to a second aspect of the present invention, in the first aspect of the present invention,
the switches are placed on the first LED mounting board and the second LED mounting board.

According to a third aspect of the present invention, in the second aspect of the present invention,
each of the switches is provided so as to correspond to one LED, and
the LEDs and the switches are alternately arranged in the first LED mounting board and the second LED mounting board.

According to a fourth aspect of the present invention, in the second aspect of the present invention,
a packaged switch in which two switches are integrally formed is used, and
the packaged switch is disposed in a region between the LED corresponding to one of the two switches and the LED corresponding to the other of the two switches.

According to a fifth aspect of the present invention, in the fourth aspect of the present invention,
a height of the packaged switch is equal to or smaller than a thickness of a light incident portion of the light guide plate.

According to a sixth aspect of the present invention, in the second aspect of the present invention, each of the switches is connected in parallel with two adjacent LEDs.

According to a seventh aspect of the present invention, in the second aspect of the present invention, a height of each of the LEDs and a height of each of the switches are equal to or smaller than a thickness of the light incident portion of the light guide plate.

According to an eighth aspect of the present invention, in the first aspect of the present invention, each of the LEDs is integrally formed with a corresponding switch, as a composite element.

According to a ninth aspect of the present invention, in the eighth aspect of the present invention, a height of the composite element is equal to or smaller than a thickness of a light incident portion of the light guide plate.

According to a tenth aspect of the present invention, in the eighth aspect of the present invention, the composite element includes
a terminal connected to the anode terminal of a LED constituting the composite element,
a terminal connected to the cathode terminal of the LED constituting the composite element,
a terminal configured to receive a control signal that controls on/off of a switch constituting the composite element, and
a terminal configured to receive a high-level voltage for operation of the switch constituting the composite element, and
a terminal configured to receive a low-level voltage for operation of the switch constituting the composite element.

According to an eleventh aspect of the present invention, in the tenth aspect of the present invention, the composite element further includes a terminal for error output.

According to a twelfth aspect of the present invention, in the first aspect of the present invention, each of the LEDs is a side light-emitting type that emits light in a direction horizontal to a surface of the board on which the relevant LED is placed.

According to a thirteenth aspect of the present invention, in the first aspect of the present invention, only one DC-DC converter is provided, the converter converting a direct-current input voltage into a direct-current voltage for driving the first LED group and the second LED group.

A fourteenth aspect of the present invention is directed to a display device including:

a display panel including a display unit configured to display an image; and
the backlight device according to the first aspect of the present invention, disposed on a back surface of the display panel.

Effects of the Invention

According to the first aspect of the present invention, the cathode terminal of the LED located most downstream among the plurality of LEDs connected in series on the first LED mounting board disposed on one end side of the light guide plate and the anode terminal of the LED located most upstream among the plurality of LEDs connected in series on the second LED mounting board disposed on the other end side of the light guide plate are electrically connected through wiring formed on the LED drive board. As a result, all the LEDs on the first LED mounting board and the LEDs on the second LED mounting board are connected in series. Hence it is possible to drive all the LEDs provided as light sources by using only one system of DC-DC converter. Concerning this, conventionally, in the case of adopting a configuration in which a plurality of LEDs are provided on one end side and the other end side of the display unit as the edge-light type backlight device, two systems of DC-DC converters have been required. Since a coil being a constituent element of the DC-DC converter has a large size, conventionally, it has been difficult to reduce the size, thickness, and weight of the device. On the other hand, according to the first aspect of the present invention, as described above, only one system of DC-DC converter may be provided. Therefore, in the case of adopting the configuration in which a plurality of LEDs are provided on one end side and the other end side of the display unit as the edge light type backlight device, it is possible to reduce the size, thickness, and weight of the device as compared to the conventional one. It is also possible to obtain the effect of being able to realize improvement in conversion efficiency of the voltage for driving the LED and reduction in cost.

According to the second aspect of the present invention, since the switch for controlling the supply of the current to the LED is provided on the board (the first LED mounting board and the second LED mounting board) on which the LED is placed, it is possible to reduce the circuit scale on the LED drive board.

According to the third aspect of the present invention, on the first LED mounting board and the second LED mounting board, although the LEDs and the switches are electrically connected in parallel, the LEDs and the switches are spatially arranged alternately. Since the space between the LEDs is utilized as a place in which the switch is placed in this manner, high-density mounting is performed on the first LED mounting board and the second LED mounting board, and the board size of the backlight device as a whole can be reduced. It is thus possible to realize reduction in size, thickness, and weight of the device as compared to the conventional one, more effectively. Further, since the LED is spatially present between the switches, the heat generation in the switch is dispersed.

According to the fourth aspect of the present invention, further high-density mounting can be performed on the first LED mounting board and the second LED mounting; board.

According to the fifth aspect of the present invention, it is possible to more effectively reduce the thickness of the device.

According to the sixth aspect of the present invention, since the number of switches can be reduced, it is possible to further reduce the size, thickness, and weight of the device.

According to the seventh aspect of the present invention, it is possible to more effectively reduce the thickness of the device.

According to the eighth aspect of the present invention, due to the use of the composite element in which the LED and the switch are integrally formed, it is possible to perform more remarkable high-density mounting on the first LED mounting board and the second LED mounting board.

According to the ninth aspect of the present invention, it is possible to more effectively reduce the thickness of the device.

According to the tenth aspect of the present invention, the same effect as that of the first aspect of the present invention can be obtained.

According to the eleventh aspect of the present invention, when an abnormality occurs, processing in response to the abnormality can be performed.

According to the twelfth aspect of the present invention, the same effect as that of the first aspect of the present invention can be obtained.

According to the thirteenth aspect of the present invention, in the edge-light type backlight device having a configuration in which a plurality of LEDs are provided on one end side and the other end side of the display unit (the one end side and the other end side of the light guide plate), since only one DC-DC converter is provided, it is possible to reliably realize reduction in size, thickness, and weight of the device as compared to the conventional one.

According to the fourteenth aspect of the present invention, the display device can be achieved, with which the same effect as the effect of any one of the first to thirteenth aspects of the present invention can be obtained.

MODES FOR CARRYING OUT THE INVENTION

Embodiments will be described below with reference to the accompanying drawings.

1. First Embodiment

<1.1 Overall Configuration and Overview of Operation>

Figure 1:
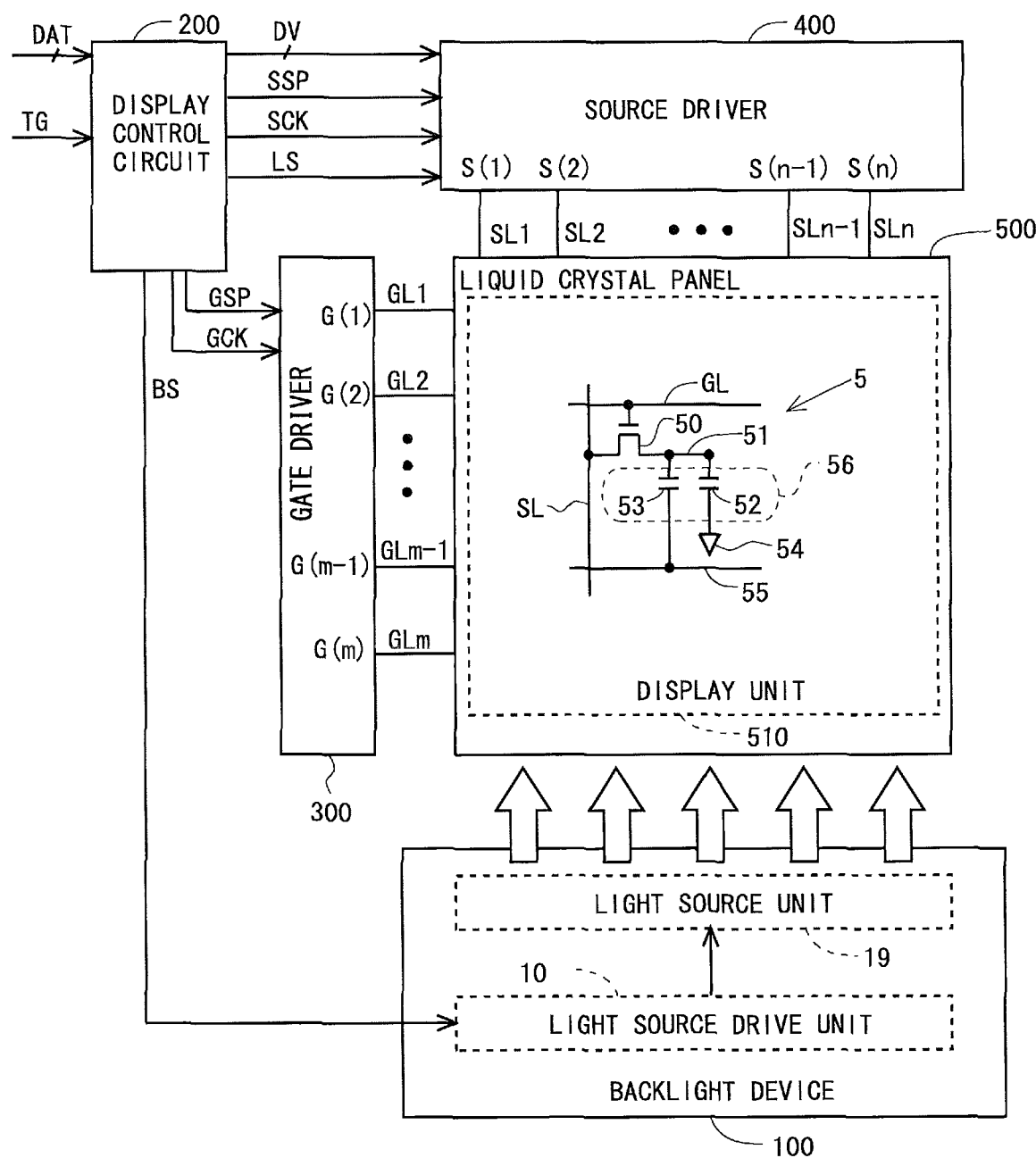
FIG. 1 is a block diagram showing an overall configuration of a liquid crystal display device provided with a backlight device according to a first embodiment.

FIG. 1 is a block diagram showing an overall configuration of a liquid crystal display device provided with a backlight device 100 according to a first embodiment. This liquid crystal display device is constituted by the backlight device 100, a display control circuit 200, a gate driver (scanning signal line drive circuit) 300, a source driver (video signal line drive circuit) 400, and a liquid crystal panel (display panel) 500. The backlight device 100 is constituted by a light source unit 19 and a light source drive unit 10. The liquid crystal panel 500 includes a display unit 510 for displaying an image. Note that the gate driver 300 or the source driver 400, or both of those drivers, may be provided in the liquid crystal panel 500.

With respect to FIG. 1, in the display unit 510, a plurality of (n) source bus lines (video signal lines) SL1 to SLn and a plurality of (m) gate bus lines (scanning signal lines) GL1 to GLm) are disposed. Pixel formation portions 5 that form pixels are provided at the respective intersections of the source bus lines SL1 to SLn and the gate bus lines GL1 to GLm. That is, the display unit 510 includes a plurality of (m×n) pixel formation portions 5. The plurality of pixel formation portions 5 are arranged in a matrix to form a pixel matrix. Each pixel formation portion 5 includes a thin-film transistor (TFT) 50 which is a switching element having a gate terminal connected to a gate bus line GL passing through a corresponding intersection, and a source terminal connected to a source bus line SL passing through the intersection; a pixel electrode 51 connected to a drain terminal of the TFT 50; a common electrode 54 and an auxiliary capacitance electrode 55 which are provided so as to be shared by the plurality of pixel formation portions 5; a liquid crystal capacitance 52 formed by the pixel electrode 51 and the common electrode 54; and an auxiliary capacitance formed by the pixel electrode 51 and the auxiliary capacitance electrode 55. By the liquid crystal capacitance 52 and the auxiliary capacitance 53, a pixel capacitance 56 is formed. Note that in the display unit 510 of FIG. 1, only the constituent elements corresponding to one pixel formation portion 5 are shown.

Meanwhile, as for the TFTs 50 in the display unit 510, for example, an oxide TFT (a thin-film transistor using an oxide semiconductor as a channel layer) can be adopted. More specifically, it is possible to adopt, as the TFT 50, a TFT having a channel layer formed by indium gallium zinc oxide (In—Ga—Zn—O) which is an oxide semiconductor having indium (In), gallium (Ga) zinc (Zn), and oxygen (O) as the main components (hereinafter, referred to as "In—Ga—Zn—O-TFT"). By adopting such an In—Ga—Zn—O-TFT, effects such as an improvement in definition and a reduction in power consumption can be obtained. Further, it also possible to adopt transistors using oxide semiconductors other than indium gallium zinc oxide (In—Ga—Zn—O) as a channel layer. For example, also when a transistor using, as the channel layer, an oxide semiconductor containing at least one of indium, gallium, zinc, copper (Cu), silicon (Si), tin (Sn), aluminum (Al), calcium (Ca), germanium (Ge), and lead (Pb) is adopted, the same effects can be obtained. Note that the use of TFTs other than oxide TFTs is not excluded.

Figure 2:
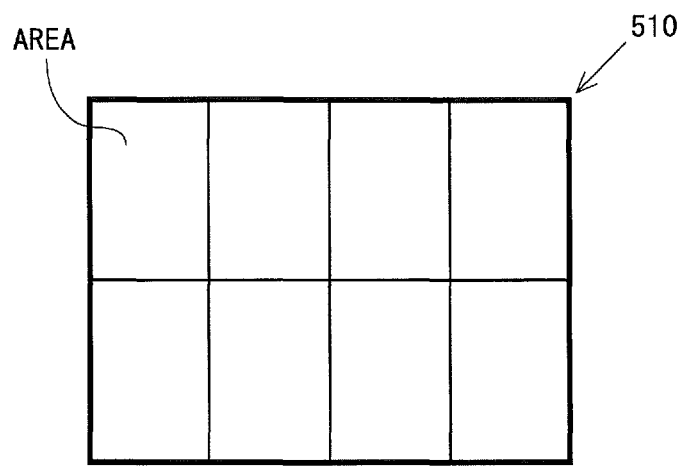
FIG. 2 is a diagram for explaining an area in the first embodiment.

In the present embodiment, in order to perform the local dimming process, the display unit 510 for displaying an image is logically (not physically) divided into a plurality of areas (areas each being the minimum unit for controlling the luminance of the light source) as shown in FIG. 2. More specifically, logically, the display unit 510 is vertically divided into two and horizontally divided into four. That is, the display unit 510 is logically divided into eight areas. The reason why the display unit 510 is vertically divided into two is that an edge-light system in which the LEDs as the light sources are provided on the upper side and the lower side of the display unit 510 has been adopted as described later. None that the number of horizontal divisions of the display unit 510 is not limited to four.

Next, the operation of the constituent elements shown in FIG. 1 will be described. The display control circuit 200 receives an image signal DAT and a timing signal group TG such as a horizontal synchronizing signal and a vertical synchronizing signal, which are sent from the outside, and outputs a digital video signal DV, a gate start pulse signal GSP and a gate clock signal GCK for controlling the operation of the gate driver 300, a source start pulse signal SSP, a source clock signal SCK, and a latch strobe signal LS for controlling the operation of the source driver 400, and a light source control signal BS for controlling the operation of the light source drive unit 10.

The gate driver 300 repeats application of active scanning signals G(1) to G(m) to the respective gate bus lines GL1 to GLm, taking one vertical scanning period as a cycle, based on the gate start pulse signal GSP and the gate clock signal GCK sent from the display control circuit 200.

The source driver 400 receives the digital video signal DV, the source start pulse signal SSP, the source clock signal SCK, and the latch strobe signal LS that are sent from the display control circuit. 200, and apples driving video signals S(1) to S(n) to the source bus lines SL1 to SLn. At this time, the source driver 400 sequentially holds digital video signals DV indicating voltages to be applied to the respective source bus lines SL1 to SLn at timing when a pulse of the source clock signal SCK is generated. Then, the held digital video signals DV are converted into analog voltages at timing when a pulse of the latch strobe signal LS is generated. The converted analog voltages are simultaneously applied as the driving video signals S(1) to S(n) to all of the source bus lines SL1 to SLn.

The light source drive unit 10 controls the luminance (light emission intensity) of the plurality of LEDs constituting the light source unit 19 based on the light source control signal BS sent from the display control circuit 200. Thereby, backlight light is applied from the backlight device 100 to the back surface of the liquid crystal panel 500. Note that a circuit as the light source drive unit 10 and the plurality of LEDs constituting the light source unit 19 constitute a backlight drive circuit to be described later.

As described above, the scanning signals G(1) to G(m) are applied to the gate bus lines GL1 to GLm, the driving video signals S(1) to S(n) are applied to the source bus lines SL1 to SLn, and the luminance of each LED constituting the light source unit 19 is controlled, whereby an image corresponding to the image signal DAT sent from the outside is displayed on the display unit 510.

<1.2 Outline of Backlight Device>

Figure 3:
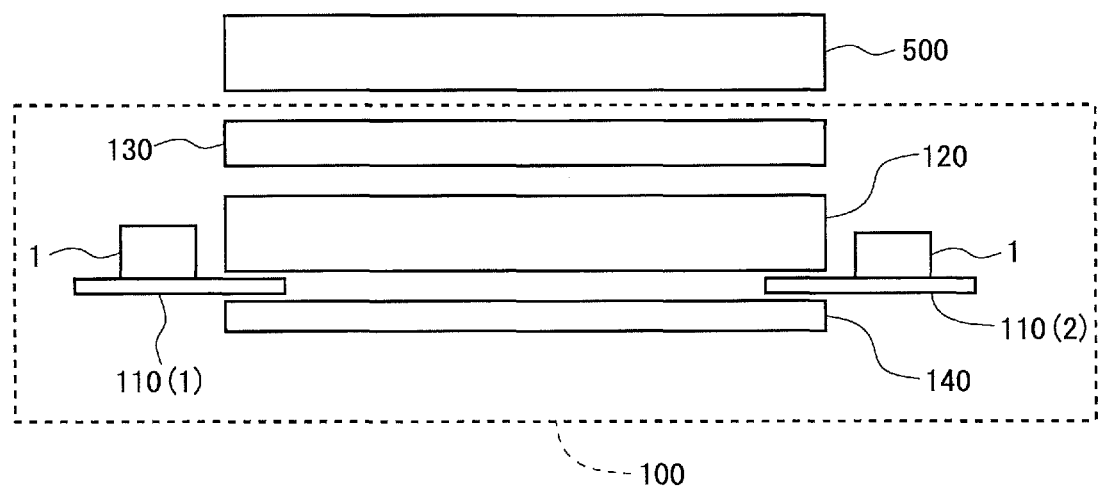
FIG. 3 is a schematic side view of the backlight device in the first embodiment.

FIG. 3 is a schematic side view of the backlight device 100 in the present embodiment. This backlight device 100 includes: LEDs 1 as light sources; LED mounting boards 110(1), 110(2) on each of which the LEDs 1 are placed; a light guide plate 120 for planarly emitting light emitted from the LEDs 1 toward the liquid crystal panel 500; an optical sheet 130 for increasing the efficiency of light applied toward the liquid crystal panel 500; and an LED drive board 140 having a circuit (not shown in FIG. 3) for driving the LEDs 1. Note that numeral 110(1) is attached to the LED mounting board disposed on the upper side of the display unit 510 (one end side of the light guide plate 120), and numeral 110(2) is attached to the LED mounting board disposed on the lower side of the display unit 510 (the other end side of the light guide plate 120). In the present embodiment, it is assumed that flexible printed circuit (FPC) has been adopted as the LED mounting board 110 (the same applies to the second to fifth embodiments to be described later). However, a board other than the EEC may be adopted as the LED mounting board 110.

The LEDs 1 are placed on the LED mounting; board 110(1) disposed on the upper side of the display unit 510 and the LED mounting board 110(2) disposed on the lower side of the display unit 510. That is, in the present embodiment, the edge-light system has been adopted in which the LEDs 1 as light sources are provided on the upper side and the lower side of the display unit 510.

The circuit formed on the LED drive board 140 and the circuit formed on the LED mounting board 110 are electrically connected. For realizing this, a terminal portion for connection with the LED drive board 140 is provided on each of the LED mounting board 110(1) and the LED mounting board 110(2), and the LED drive board 140 is provided with a terminal portion for connection with the LED mounting board 110(1) (hereinafter referred to as "first terminal portion") and a terminal portion for connection with the LED mounting board 110(2) (hereinafter referred to as "second terminal portion").

Figure 4:
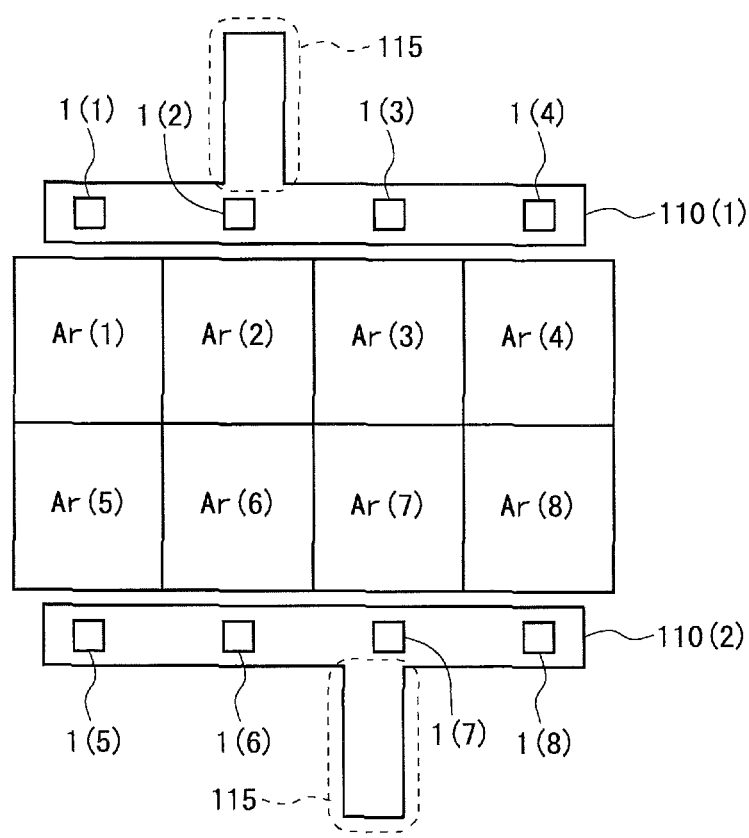
FIG. 4 is a plan view for explaining the arrangement of LEDs in the first embodiment.

FIG. 4 is a plan view for explaining the arrangement of the LEDs 1. As described above, in the present embodiment, the display unit 510 is logically divided into eight areas. In FIG. 4, the eight areas are denoted by reference symbols Ar(1) to Ar(8). Four LEDs 1(1) to 1(4), which correspond to the four areas Ar(1) to Ar(4) in the upper half of the display unit 510, are placed on the LED mounting board 110(1). Four LEDs 1(5) to 1(8), which correspond to the four areas Ar(5) to Ar(8) in the lower half of the display unit 510, are placed on the LED mounting board 110(2). Thus, in the present embodiment, the area and the LED 1 correspond one-to-one to each other. Although the display unit 510 has been logically divided as described above, the light guide plate 120 may be physically divided or not divided.

Meanwhile, while the FPC has been adopted as the LED mounting board 110 as described above, a protruding portion denoted by numeral 115 in FIG. 4 is bent and fixed to a chassis or the like of the backlight device 100.

In the present embodiment, the first LED group is realized by the LEDs 1(1) to 1(4), the second LED group is realized by the LEDs 1(5) to 1(8), the first LED mounting board is realized by the LED mounting board 110(1), and the second LED mounting board is realized by the LED mounting board 110(2).

<1.3 Backlight Drive Circuit>

Figure 5:
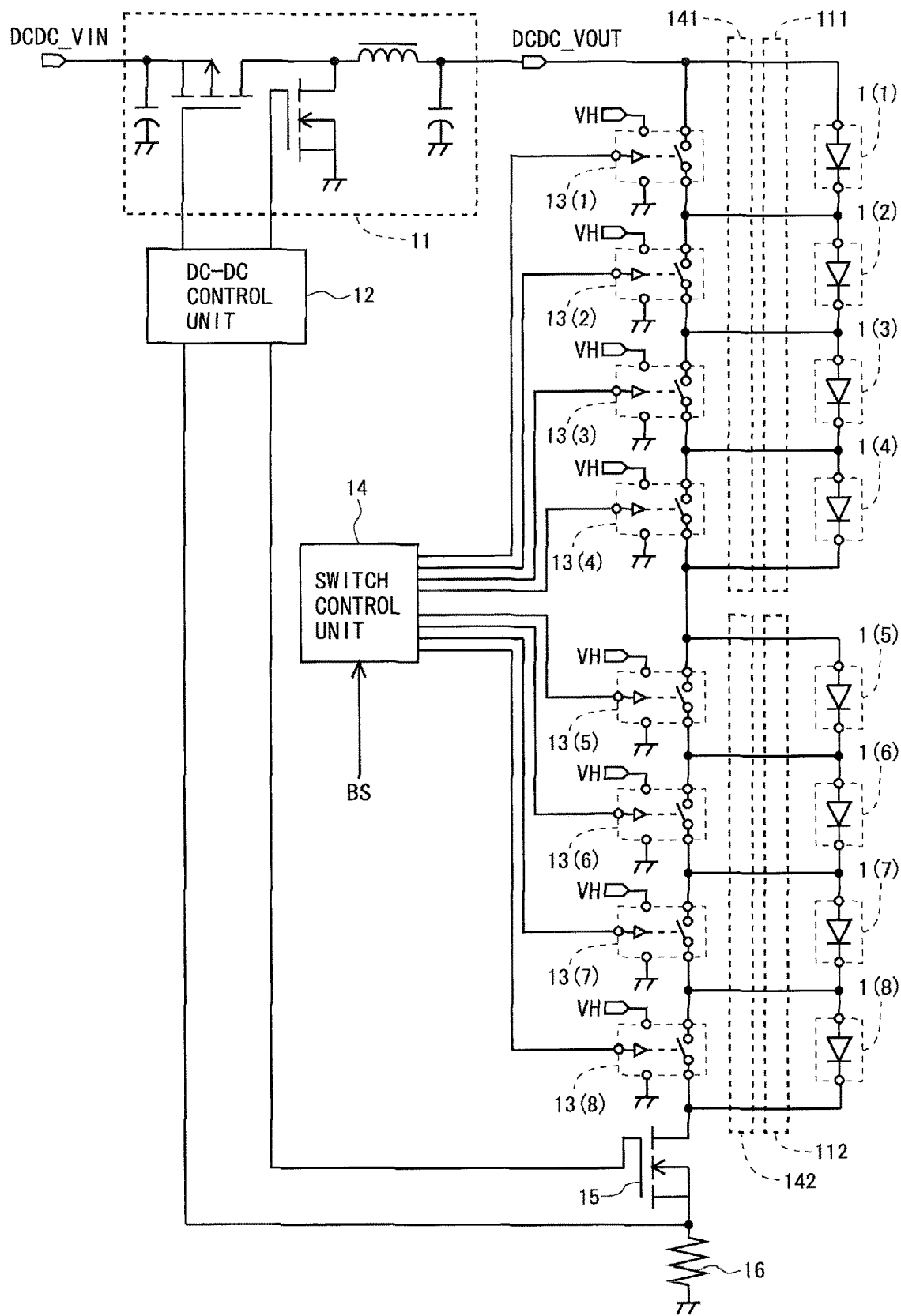
FIG. 5 is a circuit diagram showing a configuration of a backlight drive circuit in the first embodiment.

FIG. 5 is a circuit diagram showing a configuration of a backlight drive circuit in the present embodiment. The backlight drive circuit is constituted by the above-described eight LEDs 1(1) to 1(8), eight switches 13(1) to 13(8) corresponding to the eight LEDs 1(1) to 1(8), respectively, a DC-DC converter 11, a. DC-DC control unit 12, a switch control unit 14, an FET 15, and a sense resistor 16. As understood from FIG. 5, the eight LEDs 1(1) to 1(8) are connected in series. Further, each switch 13 is provided so as to be in parallel with the corresponding LED 1.

The DC-DC converter 11 converts the input direct-current voltage (input voltage DCDC_VIN) into a direct-current voltage (output voltage DCDC_VOUT) having another magnitude. In order to realize such conversion of the direct-current voltage, the DC-DC converter 11 includes a switch (e.g., MOSFET), a coil, a capacitor with polarity, and the like. However, as to the specific configuration of the DC-DC converter 11, various known configurations can be adopted, and the specific configuration is not limited to the configuration shown in FIG. 5. Meanwhile, a forward voltage of the LED 1 changes with a temperature, for example. Further, in the present embodiment, the luminance (light emission intensity) of the LED 1 is individually controlled by the local dimming process. Therefore, the voltage necessary for causing all the LEDs 1(1) to 1(8) to emit light with desired luminance changes. Thus, in order to obtain the required voltage, the DC-DC converter 11 is included in the backlight drive circuit.

The DC-DC control unit 12 controls on/off of, for example, the switch on the high side and the switch on the low side based on the voltage obtained by the sense resistor 16 so that the output voltage DCDC_VOUT has a desired magnitude. In addition, the DC-DC control unit 12 controls a gate voltage of the FET 15 based on the voltage obtained by the sense resistor 16 so that a constant current is supplied to the LEDs 1.

The switch control unit 14 controls on/off of the eight switches 13(1) to 13(8) based on the light source control signal BS sent from the display control circuit 200 (see FIG. 1). When a certain switch 13 is off, a current is supplied to the LED 1 corresponding to the switch 13. On the other hand, when a certain switch 13 is on, no current is supplied to the LED 1 corresponding to the switch 13 (the current flows through the switch 13 side). In this manner, the supply of the current to the LEDs 1 is controlled by turning on/off the switch 13. By performing such control of current for each LED 1, the luminance is adjusted for each LED 1.

<1.4 Wire Connecting Method>

Next, a wire connecting method regarding the backlight drive circuit (see FIG. 5) will be described. With respect to the constituent elements shown in FIG. 5, the LEDs 1(1) to 1(4) are constituent elements provided on the LED mounting board 110(1), the LEDs 1(5) to 1(8) are constituent elements provided on the LED mounting boards 110(2), and the DC-DC converter 11, the DC-DC control unit 12, the switches 13(1) to 13(8), the switch control unit 14, the FET 15, and the sense resistor 16 are constituent elements provided on the LED drive board 140. In FIG. 5, a dotted-line portion denoted by numeral 111 indicates a terminal portion of the LED mounting board 110(1), a dotted-line portion denoted by numeral 112 indicates a terminal portion of the LED mounting board 110(2), a dotted-line portion denoted by numeral 141 indicates a first terminal portion of the LED drive board 140, and a dotted-line portion denoted by numeral 142 indicates a second terminal portion of the LED drive board 140.

As understood from FIG. 5, in the present embodiment, the cathode terminal of the LED 1(4) disposed most downstream on the LED mounting board 110(1) and the anode terminal of the LED 1(5) disposed most upstream on the LED mounting board 110(2) are electrically connected through wiring formed on the LED drive board 140.

<1.5 Effects>

Conventionally, when the configuration is adopted in which a plurality of LEDs are provided on one end side and the other end side of a display unit as the edge-light type backlight device, a DC-DC converter for driving the LEDs on one end side of the display unit and a DC-DC converter for driving the LEDs on the other end side of the display unit have been required. That is, two systems of DC-DC converters have been required. Especially, a coil being a constituent element of the DC-DC converter has a large size, and hence, conventionally, it has been difficult to reduce the size, thickness, and weight of the device. On the other hand, according to the present embodiment, the cathode terminal of the LED 1(4) located most downstream among the four LEDs 1(1) to 1(4) connected in series on the LED mounting board 110(1) disposed on the upper side (one end side) of the display unit 510 and the anode terminal of the LED 1(5) located most upstream among the four LEDs 1(5) to 1(8) connected in series on the LED mounting board 110(2) disposed on the lower side (the other end side) of the display unit 510 are electrically connected through the wiring formed on the LED drive board 140. As a result, all the four LEDs 1(1) to 1(4) on the LED mounting board 110(1) and the four LEDs 1(5) to 1(8) on the LED mounting board 110(2) are connected in series. Hence it is possible to drive all of the LEDs 1(1) to 1(8) provided as the light sources by using only one system of DC-DC converters 11. Therefore, in the case of adopting the configuration in which a plurality of LEDs 1 are provided on ore end side and the other end side of the display unit 510 as the edge-light type backlight device, it is possible to reduce the size, thickness, and weight of the device as compared to the conventional one. It is also possible to obtain the effect of being able to realize improvement in conversion efficiency of the voltage for driving the LED and reduction in cost

2. Second Embodiment

<2.1 Overview>

A second embodiment will be described. In the following, differences from the above first embodiment will be mainly described, and the description of the same respects as those in the first embodiment will be omitted. In the present embodiment, switches (switches for controlling the supply of the current to the LEDs 1) 13 are placed on the LED mounting board 110 in addition to the LEDs 1. Further, in the present embodiment, unlike the first embodiment, the display unit 510 is logically divided into four areas. More specifically, logically, the display unit 510 is not vertically divided, but only horizontally divided into four.

<2.2 Outline of Backlight Device>

Figure 6:
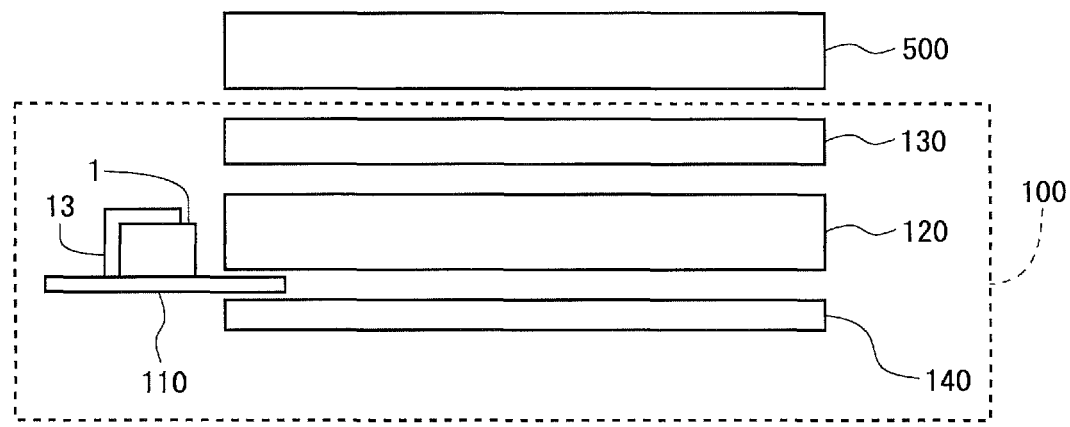
FIG. 6 is a schematic side view of a backlight device in a second embodiment.

FIG. 6 is a schematic side view of the backlight device 100 in the present embodiment. This backlight device 100 includes the LED 1 as the light source, the switch 13 for controlling the supply of the current to the LED 1, the LED mounting board 110 on which the LED 1 and the switch 13 are placed, the light guide plate 120, the optical sheet 130, and the LED drive board 140. As understood from FIG. 6, in the present embodiment, the LED mounting board 110 is provided only on one end side (upper side) of the display unit 510. That is, the edge-light system has been adopted in which the LEDs 1 as the light sources are provided only on the upper side of the display unit 510. Although the switches 13 are placed on the LED drive board 140 in the first embodiment, the switches 13 are placed on the LED mounting board 110 in the present embodiment. Note that the LED mounting board 110 is provided with a terminal portion for connection with the LED drive board 140, and the LED drive board 140 is provided with a terminal portion for connection with the LED mounting board 110.

Figure 7:
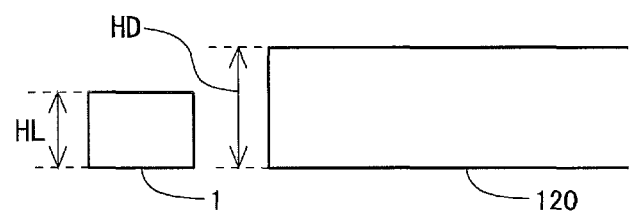
FIG. 7 is a diagram for describing a height of an LED in the second embodiment.
Figure 8:
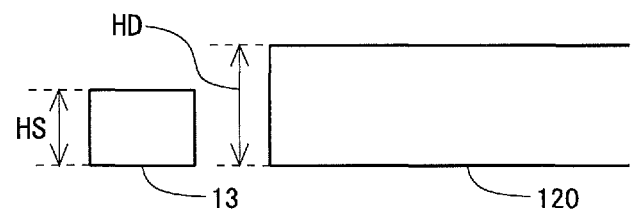
FIG. 8 is a diagram for describing a height of a switch in the second embodiment.

Here, the heights of the LED 1 and the switch 13 will be described. As shown in FIG. 7, a height HL of the LED 1 is equal to or smaller than a thickness HD of the light incident portion of the light guide plate 120. Further, as shown in FIG. 8, a height HS of the switch 13 is equal to or smaller than the thickness HD of the light incident portion of the light guide plate 120. In this manner, both the height HL of the LED 1 and the height HS of the switch 13 are equal to or smaller than the thickness HD of the light incident portion of the light guide plate 120. The relationship between the height HL of the LED 1 and the height HS of the switch 13 is not particularly limited.

Figure 9:
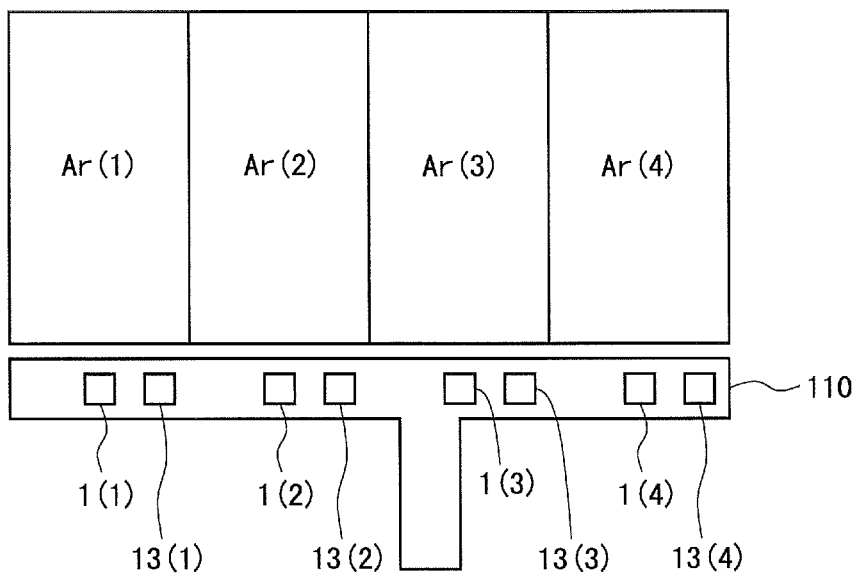
FIG. 9 is a plan view for explaining the arrangement of LEDs and switches in the second embodiment.

FIG. 9 is a plan view for explaining the arrangement of the LEDs 1 and the switches. As described above, in the present embodiment, the display unit 510 is logically divided into four areas Ar(1) to Ar(4). Four LEDs 1(1) to 1(4) corresponding to the four areas Ar(1) to Ar(4), respectively, and four switches 13(1) to 13(4) corresponding to the four LEDs 1(1) to 1(4), respectively, are placed on the LED mounting board 110.

Figure 10:
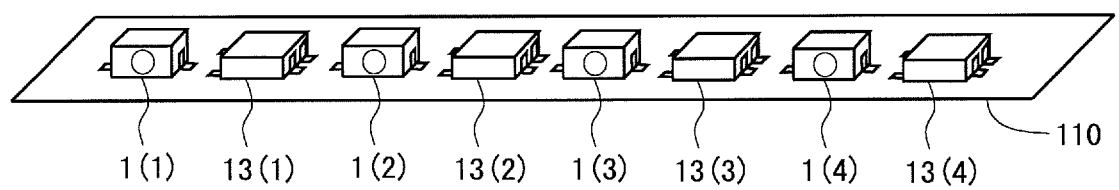
FIG. 10 is a perspective view of an LED mounting board in the second embodiment.

FIG. 10 is a perspective view of the LED mounting board 110. In FIG. 10, illustration of the protruding portion for fixing to the chassis or the like is omitted (the same applies to FIGS. 15 and 18). As shown in FIG. 10, on the LED mounting board 110, the four LEDs 1(1) to 1(4) and the four switches 13(1) to 13(4) are arranged substantially in alignment so that the LEDs 1 and the switches 13 are positioned alternately.

<2.3 Backlight Drive Circuit>

Figure 11:
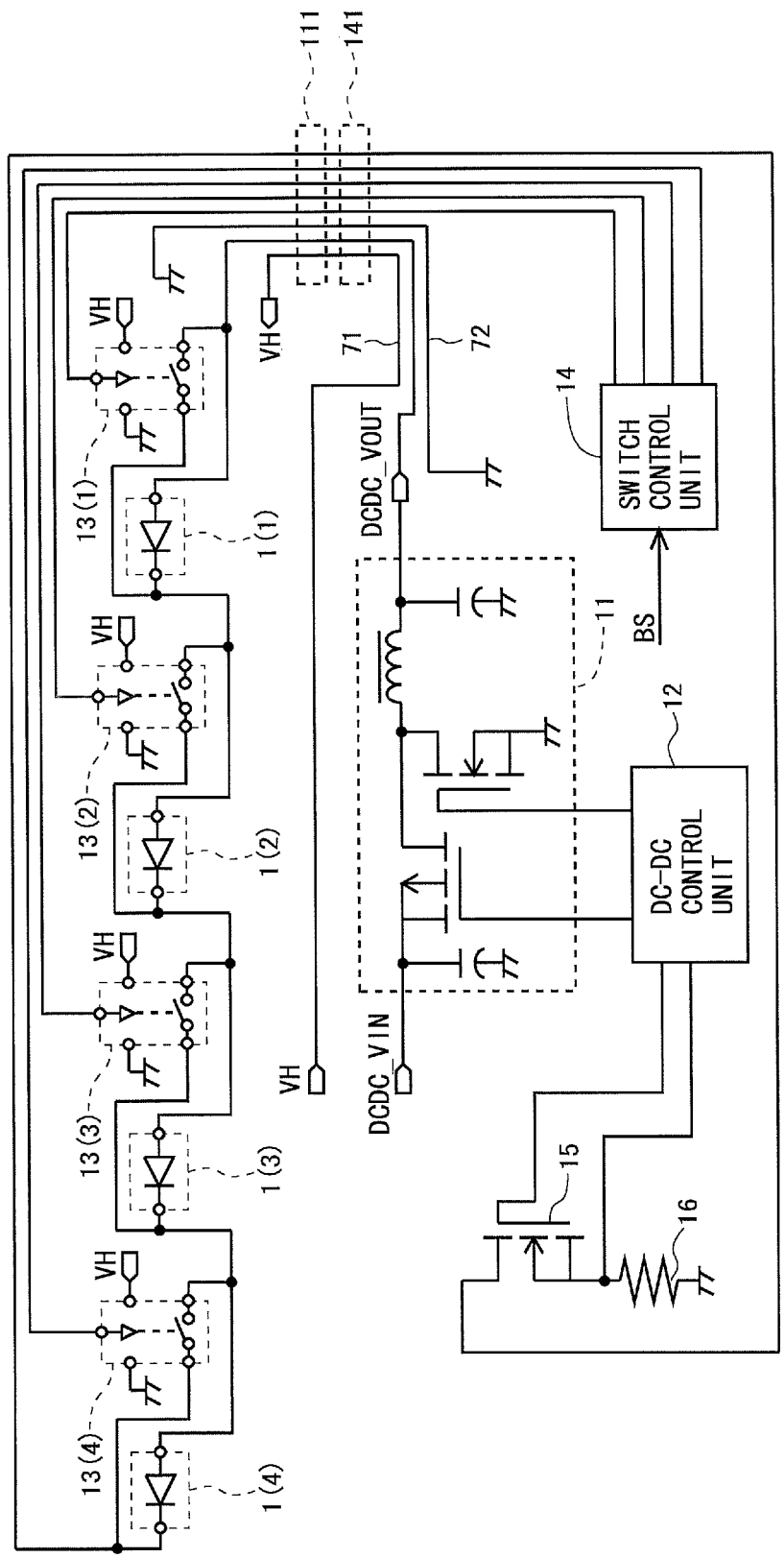
FIG. 11 is a circuit diagram showing a configuration of a backlight drive circuit in the second embodiment.

FIG. 11 is a circuit diagram showing a configuration of a backlight drive circuit in the present embodiment. The backlight drive circuit is constituted by the above-described four LEDs 1(1) to 1(4), the four switches 13(1) to 13(4) corresponding to the four LEDs 1(1) to 1(4), respectively, the DC-DC converter 11, the DC-DC control unit 12, the switch control unit 14, the FET 15, and the sense resistor 16. As understood from FIG. 11, the four LEDs 1(1) to 1(4) are connected in series. Further, each switch 13 is provided so as to be in parallel with the corresponding LED 1. In this manner, although each LED 1 and the corresponding switch 13 are electrically connected in parallel, the four LEDs 1(1) to 1(4) and the four switches 13(1) to 13(4) are spatially arranged substantially in alignment as described above (see FIG. 10).

With respect to the constituent elements shown in FIG. 11, the LEDs 1(1) to 1(4) and the switches 13(1) to 13(4) are constituent elements provided on the LED mounting board 110, and the DC-DC converter 11, the DC-DC control unit 12, the switch control unit 14, the FET 15, and the sense resistor 16 are constituent elements provided on the LED drive board 140. Here, in FIG. 11, a dotted-line portion denoted by numeral 111 indicates a terminal portion of the LED mounting board 110, and a dotted-line portion denoted by numeral 141 indicates a terminal portion of the LED drive board 140.

In the present embodiment, the power supply voltage (high-level voltage) VH, which is about 2 to 10 V higher than the output voltage DCDC_VOUT (this voltage is the anode voltage of the LED 1(1)) from the DC-DC converter 11 and a reference voltage (low-level voltage) GND thereof are supplied from the LED drive board 140 to the LED mounting board 110 by using wires 71, 72, respectively. The power supply voltage VH and the reference voltage GND are applied to the switches 13. That is, the power supply voltage VH, which is about 2 to 10 V higher than the output voltage DCDC_VOUT, and the reference voltage GND thereof are taken as voltages for operation of the switches 13. As a result, turning on/off of the switch 13 for controlling the supply of the current to the LED 1 is stably performed. Further, the size of the switch 13 can be made relatively small.

In the configuration as described above, similarly to the first embodiment, the switch control unit 14 controls on/off of the four switches 13(1) to 13(4) based on the light source control signal BS sent from the display control circuit 200 (see FIG. 1). Thus, the supply of the current is controlled for each LED 1, and the luminance is adjusted for each LED 1.

<2.4 Effects>

According to the present embodiment, in the edge-light type backlight device having the configuration in which a plurality of LEDs 1 are provided on one end side of the display unit 510, the LEDs 1 and the switches (the switches for controlling the supply of the current to the LEDs 1) 13 are provided on the LED mounting board 110. On the LED mounting board 110, although the LEDs 1 and the switches 13 are electrically connected in parallel so as to enable the local dimming process, the plurality of LEDs 1 and the plurality of switches 13 are spatially arranged substantially in alignment so that the LEDs 1 and the switches 13 are positioned alternately. Since the space between the LEDs 1 is in this manner utilized as a place in which the switch 13 is placed, the high-density mounting is performed on the LED mounting board 110, and the board size of the backlight device 100 as a whole can be reduced. Further, since both the height HL of the LED 1 and the height HS of the switch 13 are equal to or smaller than the thickness HD of the light incident portion of the light guide plate 120, the thickness of the device can be reduced. From the above, in the case of adopting the configuration in which a plurality of LEDs 1 are provided on one end side of the display unit 510 as the edge-light type backlight device, it is possible to reduce the size, thickness, and weight of the device as compared to the conventional one. Further, since the LED 1 is spatially present between the switches 13, the heat generation in the switch 13 is dispersed.

Moreover, according to the present embodiment, the power supply voltage VH, which is about 2 to 10 V higher than the output voltage DCDC_VOUT (this voltage is the anode voltage of the LED 1(1)) from the DC-DC converter 11, and the reference voltage GND thereof are supplied from the LED drive board 140 to the LED mounting board 110 and applied to the switches 13. As thus described, by applying the voltage that is about 2 to 10 V higher than the voltage (LED driving voltage) capable of driving all of the LEDs 1 to the switch 13, when the switch 13 is controlled with the voltage (PWM control signal) of about 3.3 to 10 V, it is possible to turn on/off the switch 13 with low resistance. As a result, turning on/off of the switch 13 is stably performed.

<2.5 Modifications>
<2.5.1 First Modification>

A first modification of the above second embodiment will be described. In the present modification, as the switch for controlling the supply of the current to the LED 1, one formed by packaging two switches into one is used. The switch packaged in this manner is referred to as a "packaged switch" in the present specification. One packaged switch is associated with two LEDs 1.

Figure 12:
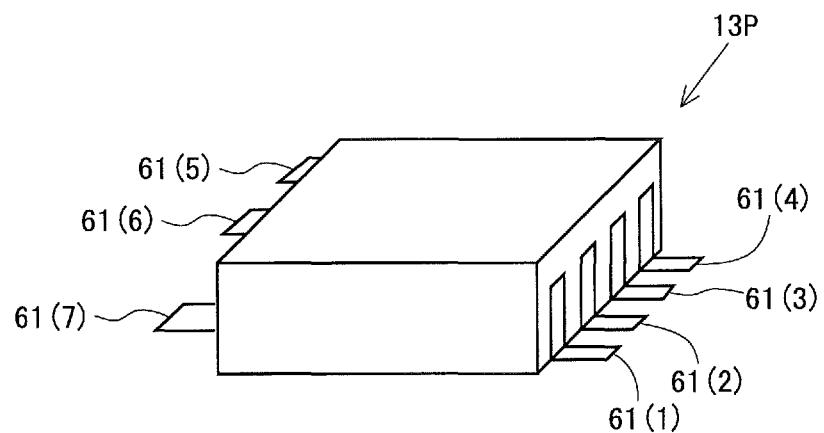
FIG. 12 is an external perspective view of a packaged switch in a first modification of the second embodiment.
Figure 13:
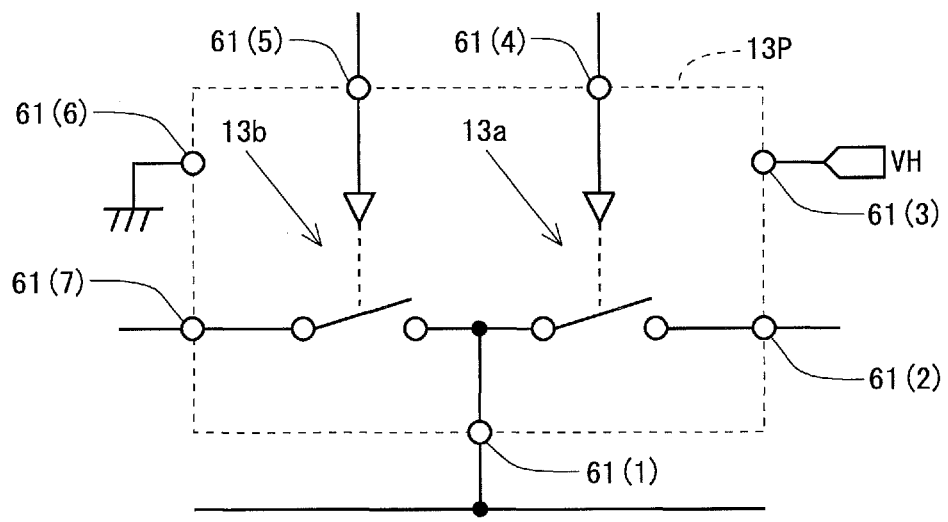
FIG. 13 is a diagram showing a detailed configuration of the inside of the packaged switch in the first modification of the second embodiment.

FIG. 12 is an external perspective view of a packaged switch 13P. This packaged switch 13P has seven terminals 61(1) to 61(7). FIG. 13 is a diagram showing a detailed configuration of the inside of the packaged switch 13P. The packaged switch 13P includes, on the inside, two switches 13a, 13b that control the supply of the current to the corresponding two LEDs 1, respectively. The switch 13a is provided between the terminal 61(2) and the terminal 61(1) and is connected in parallel with one of the corresponding two LEDs 1. Then, on/off of the switch 13a is controlled based on a control signal sent from the switch control unit 14 and applied to the terminal 61(4). The switch 13b is provided between the terminal 61(1) and the terminal 61(7) and is connected in parallel with the other of the corresponding two LEDs 1. Then, on/off of the switch 13b is controlled based on a control signal sent from the switch control unit 14 and applied to the terminal 61(5). The power supply voltage VH, which is about 2 to 10 V higher than the output voltage DCDC_VOUT from the DC-DC converter 11, is applied to the terminal 61(3), and the reference voltage GND is applied to the terminal 61(6). The power supply voltage VH and the reference voltage GND are taken as voltages for operation of the packaged switch 13P (two switches 13a, 13b). Although the packaged switch 13P with seven terminals has been described as an example here, a packaged switch 13P with eight terminals can also be adopted.

Figure 14:
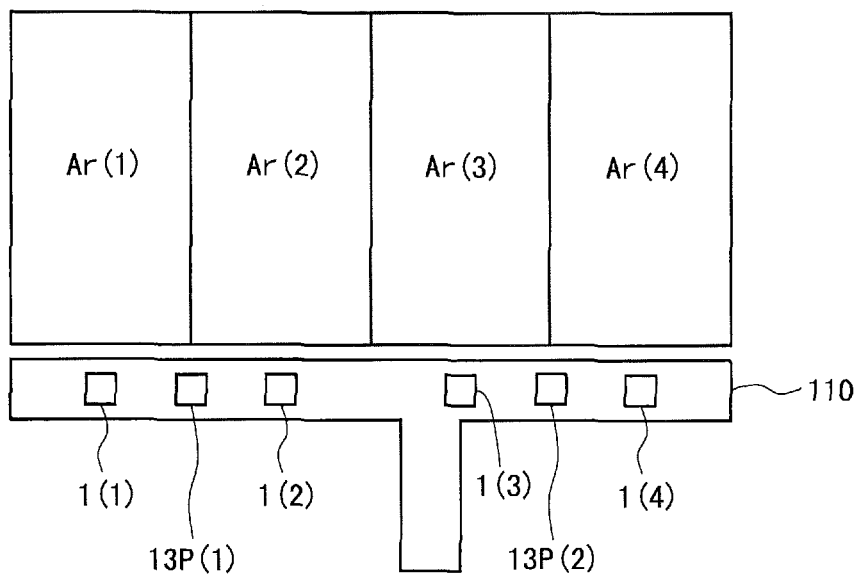
FIG. 14 is a plan view for explaining the arrangement of LEDs and packaged switches in the first modification of the second embodiment.

FIG. 14 is a plan view for explaining the arrangement of the LEDs 1 and the packaged switches 13P. As shown in FIG. 14, in the present modification, four LEDs 1(1) to 1(4) corresponding to the four areas Ar(1) to Ar(4), respectively, a packaged switch 13P(1) corresponding to the LED 1(1) and the LED 1(2), and a packaged switch 13P(2) corresponding to the LED 1(3) and the LED 1(4) are placed on the LED mounting board 110.

Figure 15:
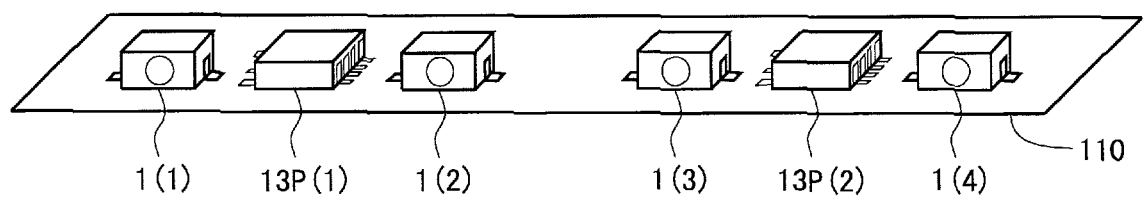
FIG. 15 is a perspective view of an LED mounting board in a first modification of the second embodiment.

FIG. 15 is a perspective view of the LED mounting board 110. As shown in FIG. 15, the four LEDs 1(1) to 1(4) and the two packaged switches 13P(1), 13P(2) are arranged substantially in alignment on the LED mounting board 110. Here, the packaged switch 13P(1) is disposed in a region between the LED 1(1) and the LED 1(2), and the packaged switch 13P(2) is disposed in a region between the LED 1(3) and the LED 1(4).

In the present modification, both the height of the LED 1 and the height of the packaged switch 13P are equal to or smaller than the thickness of the light incident portion of the light guide plate 120.

Figure 16:
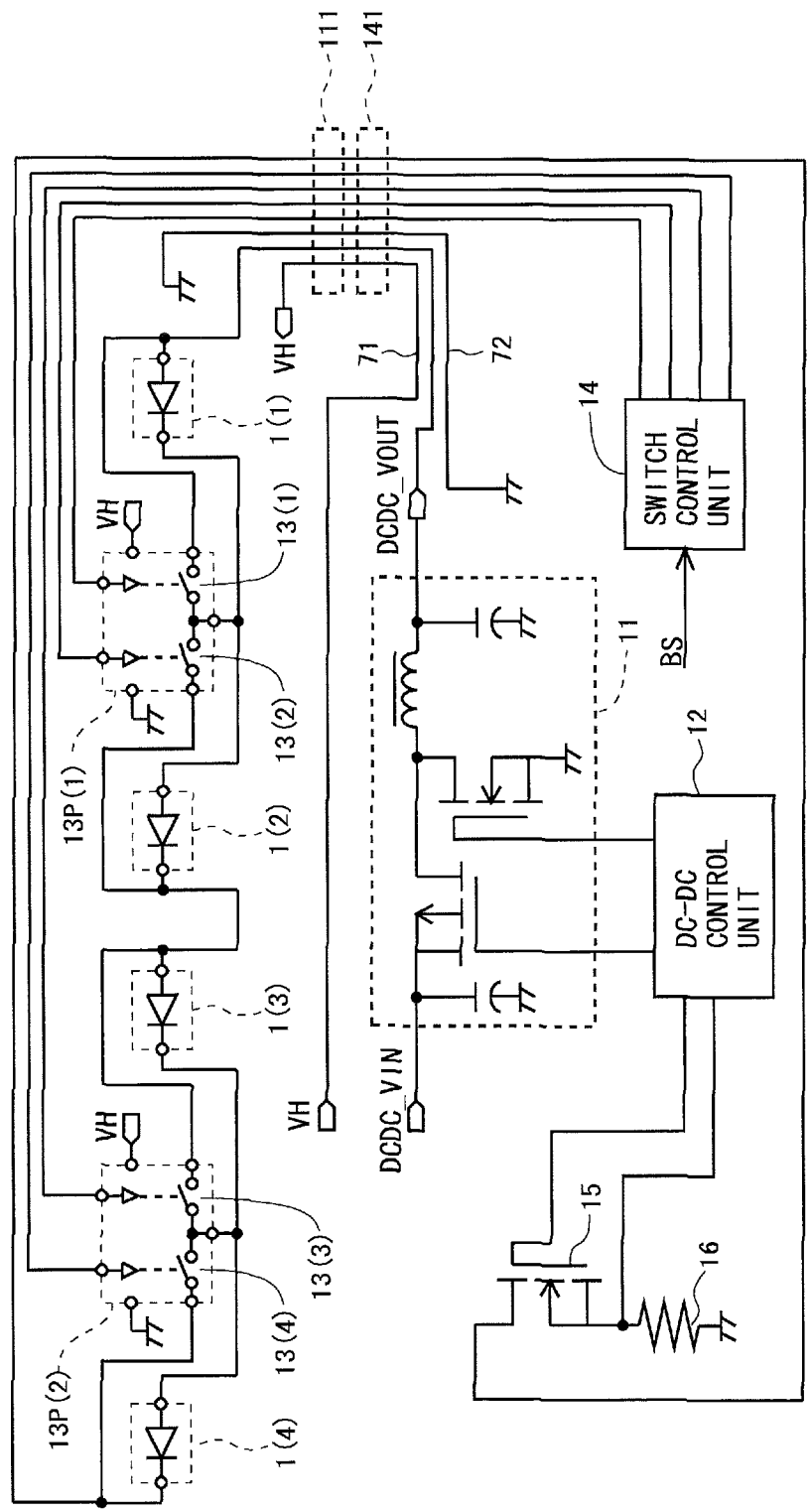
FIG. 16 is a circuit diagram showing a configuration of a backlight drive circuit in the first modification of the second embodiment.

FIG. 16 is a circuit diagram showing a configuration of a backlight drive circuit in the present modification. The backlight drive circuit is constituted by the above-described four LEDs 1(1) to 1(4), the packaged switch 13P(1) corresponding to the LED 1(1) and the LED 1(2), the packaged switch 13P(2) corresponding to the LED 1(3) and LED 1(4), the DC-DC converter 11, the DC-DC control unit 12, the switch control unit 14, the FET 15, and the sense resistor 16.

As shown in FIG. 16, the packaged switch 13P(1) includes a switch 13(1) corresponding to the LED 1(1) and a switch 13(2) corresponding to the LED 1(2). The packaged switch 13P(2) includes a switch 13(3) corresponding to the LED 1(3) and a switch 13(4) corresponding to the LED 1(4). Then, similarly to the second embodiment, the switch control unit 14 controls on/off of the four switches 13(1) to 13(4) based on the light source control signal BS sent from, the display control circuit 200 (see FIG. 1). Thus, the supply of the current is controlled for each LED 1, and the luminance is adjusted for each LED 1.

According to the present modification, in order to control the supply of the current to each LED 1, the packaged switch 13P packaged, with two switches 13 into one is used. In a case in which the switch 13 is not packaged, one switch 13 has five terminals as understood from FIG. 11 and the like. According to the present modification, the configuration of two switches 13 each having five terminals can be realized by one packaged switch 13P having seven terminals. From the above, further high-density mounting is performed on the LED mounting board 110. As a result, it is possible to further reduce the size, thickness, and weight of the device as compared to the second embodiment.

<2.5.2 Second Modification>

A second modification of the above second embodiment will be described. In the present modification, the supply of the current to the two LEDs 1 is control led by turning on/off one switch 13. In other words, one switch 13 is provided in parallel with the two LEDs 1 connected in series.

Figure 17:
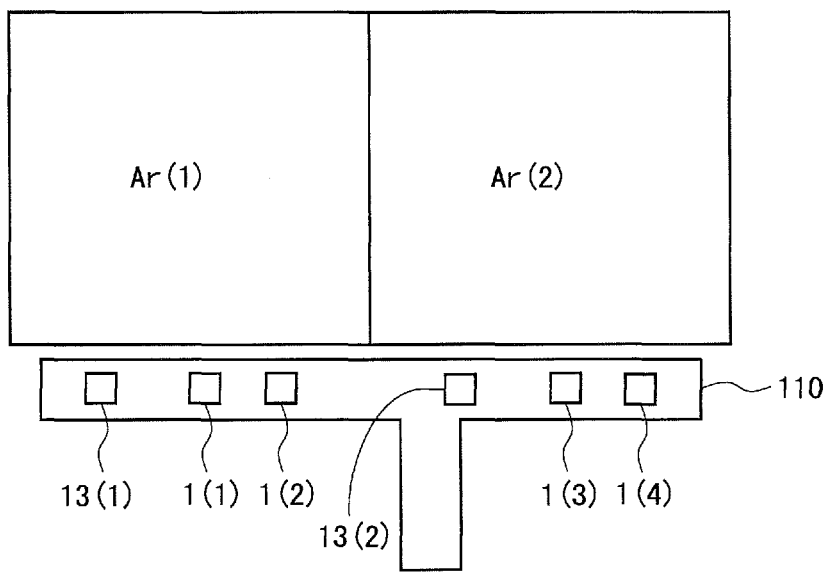
FIG. 17 is a plan view for describing the arrangement of LEDs and switches in a second modification of the second embodiment.

FIG. 17 is a plan view for explaining the arrangement of the LEDs 1 and the switches 13. As shown in FIG. 17, in the present modification, unlike the second embodiment, the display unit 510 is logically divided into two areas Ar(1) to Ar(2). The four LEDs 1(1) to 1(4), the switch 13(1) corresponding to the LED 1(1) and LED 1(2), and the switch 1(2) corresponding to the LED 1(3) and LED 1(4) are placed on the LED mounting board 110. Note that the LED 1(1) and the LED 1(2) correspond to the area Ar(1), and the LED 1(3) and the LED 1(4) correspond to the area Ar(2).

Figure 18:
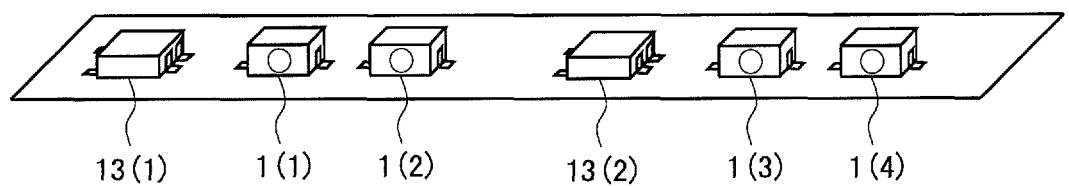
FIG. 18 is a perspective view of an LED mounting board in the second modification of the second embodiment.

FIG. 18 is a perspective view of the LED mounting board 110. As shown in FIG. 18, on the LED mounting board 110, four LEDs 1(1) to 1(4) and two switches 13(1), 13(2) are arranged substantially in alignment. In the present modification as well, both the height of the LED 1 and the height of the switch 13 are equal to or smaller than the thickness of the light incident portion of the light guide plate 120.

Figure 19:
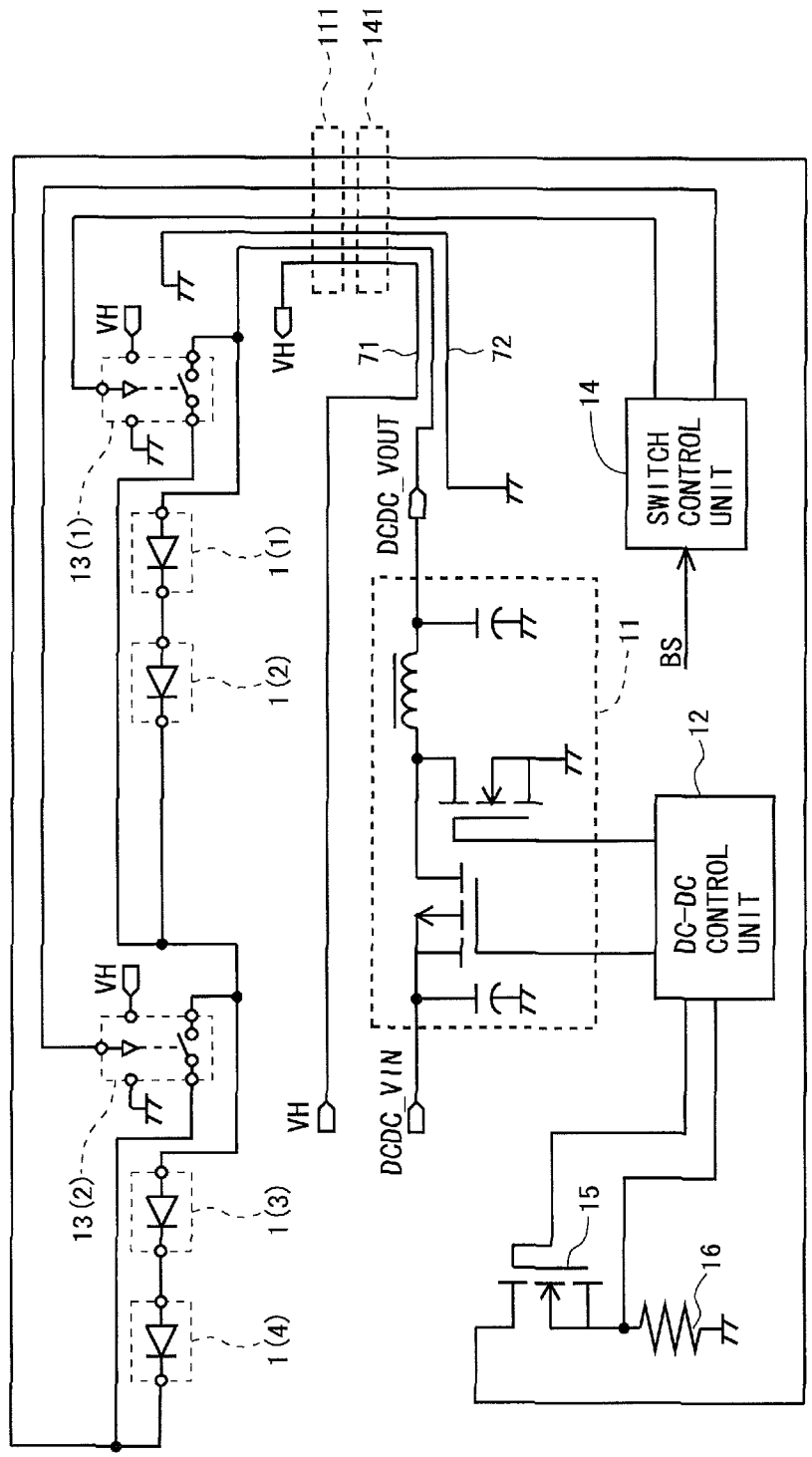
FIG. 19 is a circuit diagram showing a configuration of a backlight drive circuit in the second modification of the second embodiment.

FIG. 19 is a circuit diagram showing a configuration of a backlight drive circuit in the present modification. The backlight drive circuit is constituted by the above-described four LEDs 1(1) to 1(4), the switch 13(1) corresponding to the LED 1(1) and the LED 1(2), the switch 13(2) corresponding to the LED 1(3) and LED 1(4), the DC-DC converter 11, the DC-DC control unit 12, the switch control unit 14, the FET 15, and the sense resistor 16.

As shown in FIG. 19, the switch 13(1) is electrically disposed in parallel with the LED 1(1) and the LED 1(2), and the switch 13(2) is electrically disposed in parallel with the LED 1(3) and the LED 1(4). Therefore, the supply of the current to the LED 1(1) and the LED 1(2) is controlled by turning on/off the switch 13(1), and the supply of the current to the LED 1(3) and the LED 1(4) is controlled by turning on/off the switch 13(2). In such a configuration, the switch control unit 14 controls on/off of the two switches 13(1), 13(2) based on the light source control signal BS sent from the display control circuit 200 (see FIG. 1). This controls the supply of the current to the LED 1(1) and the LED 1(2) and the supply of the current to the LED 1(3) and the LED 1(4), respectively. In this manner, for each area, the luminance of the corresponding LEDs 1 is adjusted.

According to the present modification, only one switch 13 for controlling the supply of the current to each LED 1 is provided for the two LEDs 1. As a result, the high-density mounting is performed in the same manner as in the first modification, and it is possible to further reduce the size, thickness, and weight of the device as compared to the second embodiment.

3. Third Embodiment

<3.1 Overview>

A third embodiment of the present invention will be described. The configuration of the backlight device 100 according to the present embodiment is a combination of the feature of the first embodiment and the feature of the second embodiment. That is, while the LED mounting board 110(1) disposed on the upper side of the display unit 510 and the LED mounting board 110(2) disposed on the lower side of the display unit 510 are provided in the backlight device 100, the cathode terminal of the LED disposed most downstream on the LED mounting board 110(1) and the anode terminal of the LED disposed most upstream on the LED mounting; board 110(2) are connected through the wiring on the LED drive board 140. The switches 13 for controlling the supply of the current to the LEDs 1 are placed on the LED mounting board 110 in the same manner as in the second embodiment. Note that the display it 510 is logically divided into eight in the same manner as in the first embodiment.

<3.2 Outline of Backlight Device>

Figure 20:
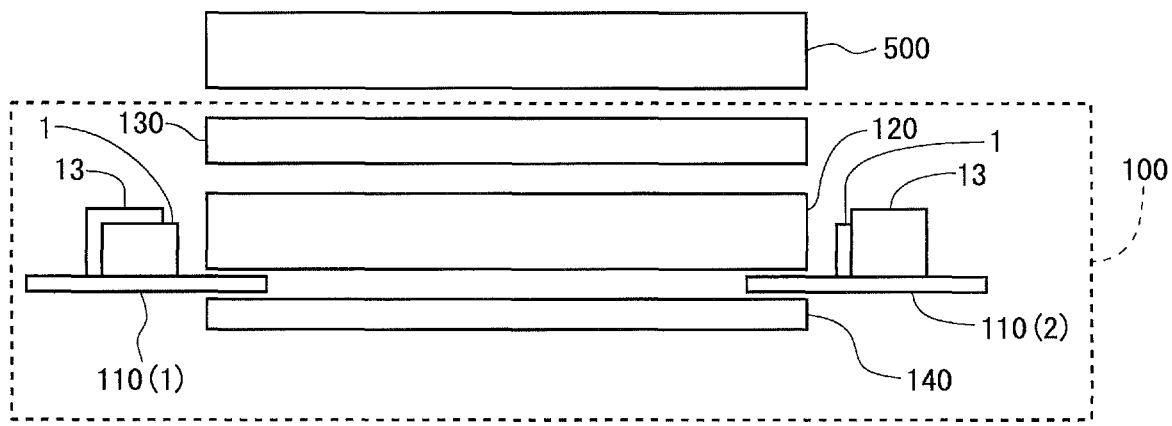
FIG. 20 is a schematic side view of a backlight device in a third embodiment.

FIG. 20 is a schematic side view of the backlight device 100 in the present embodiment. This backlight device 100 includes the LEDs 1 as the light sources, the switches 13 for controlling the supply of the current to the LEDs 1, the LED mounting boards 110(1), 110(2) on each of which the LEDs 1 and the switches 13 are placed, the light guide plate 120, the optical sheet 130, and the LED drive board 140. As understood from FIG. 20, similarly to the first embodiment, the LED mounting board 110(1) is provided on the upper side of the display unit 510 and the LED mounting board 110(2) is provided on the lower side of the display unit 510. The LEDs 1 and the switches 13 are placed on each of the LED mounting board 110(1) and the LED mounting board. 110(2). That is, in the present embodiment, the edge-light system has been adopted in which the LEDs 1 as light sources are provided on the upper side and the lower side of the display unit 510.

Figure 21:
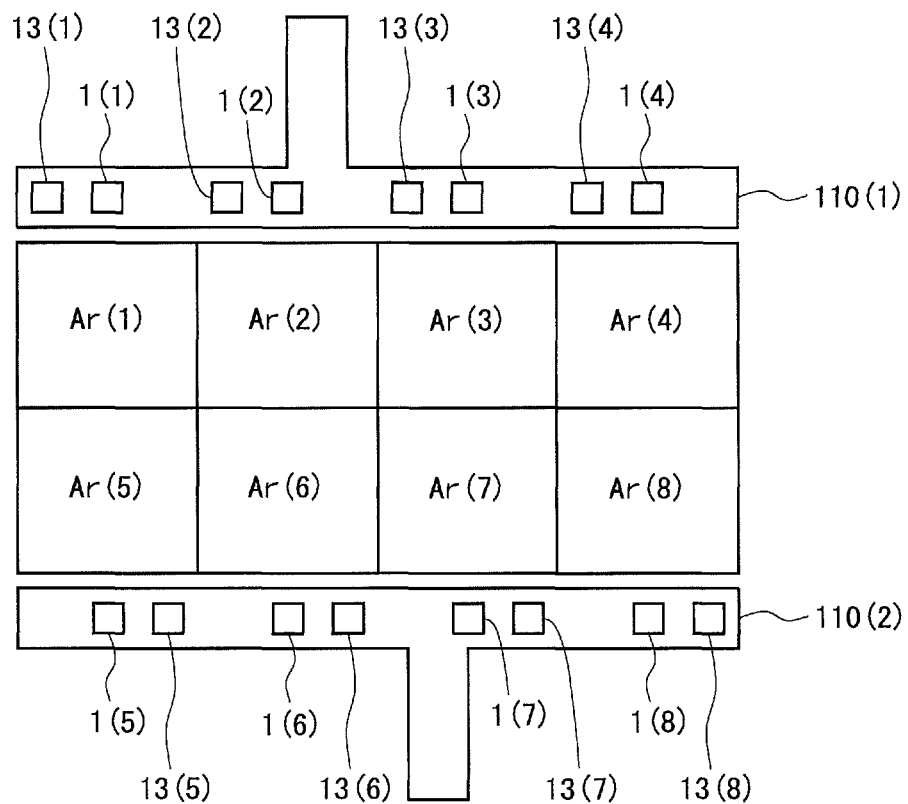
FIG. 21 is a plan view for explaining the arrangement of LEDs and switches in the third embodiment.

FIG. 21 is a plan view for explaining the arrangement of the LEDs 1 and the switches 13. Four LEDs 1(1) to 1(4), which correspond to the four areas Ar(1) to Ar(4) in the upper half of the display unit 510, and four switches 13(1) to 13(4) which correspond to the four LEDs 1(1) to 1(4) are placed on the LED mounting board 110(1) Four LEDs 1(5) to 1(8), which correspond to the four areas Ar(5) to Ar(8) in the lower half of the display unit 510, and four switches 13(5) to 13(8) which correspond to the four LEDs 1(5) to 1(8) are placed on the LED mounting board 110(2).

On each LED mounting board 110, similarly to the second embodiment, the four LEDs 1 and the four switches 13 are arranged substantially in alignment so that the LEDs 1 and the switches 13 are positioned alternately.

<3.3 Backlight Drive Circuit>

Figure 22:
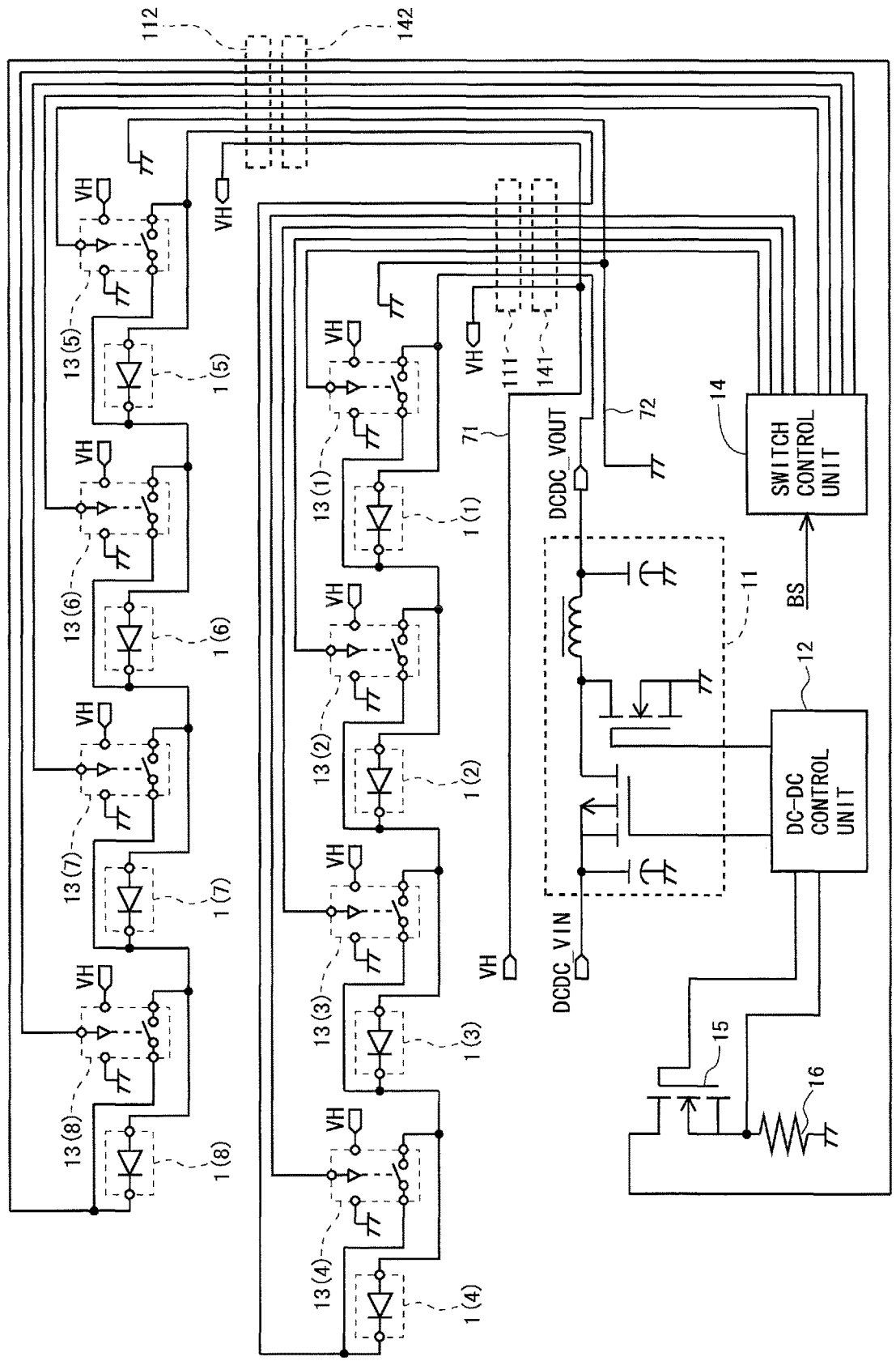
FIG. 22 is a circuit diagram showing a configuration of a backlight drive circuit in the third embodiment.

FIG. 22 is a circuit diagram showing a configuration of a backlight drive circuit in the present embodiment. The backlight drive circuit is constituted by the eight LEDs 1(1) to 1(8), the eight switches 13(1) to 13(8) corresponding (to the eight LEDs 1(1) to 1(8), respectively, the DC-DC converter 11, the DC-DC control unit 12, the switch control unit 14, the FET 15, and the sense resistor 16. Each switch 13 is provided so as to be in parallel with the corresponding LED 1. In this manner, although each LED 1 and the corresponding switch 13 are electrically connected in parallel, the four LEDs 1 and the four switches 13 are spatially arranged substantially in alignment on each LED mounting board 110 as in the second embodiment (see FIG. 10).

With respect to the constituent elements shown in FIG. 22, the LEDs 1(1) to 1(4) and the switches 13(1) to 13(4) are constituent elements provided on the LED mounting board 110(1) the LEDs 1(5) to 1(8) and the switches 13(5) to 13(8) are constituent elements provided on the LED mounting boards 110(2), and the DC-DC converter 11, the DC-DC control unit 12, the switch control unit 14, the FET 15, and the sense resistor 16 are constituent elements provided on the LED drive board 140.

Further, similarly to the second embodiment, the power supply voltage VH, which is about 2 to 10 V higher than the output voltage DCDC_VOUT from the DC-DC converter 11, and the reference voltage GND thereof are supplied from the LED drive board 140 to the LED mounting boards 110(1), 110(2) through the wires 71, 72, respectively.

Here, as understood from FIG. 22, in the present embodiment, the cathode terminal of the LED 1(4) disposed most downstream on the LED mounting board 110(1) and the anode terminal of the LED 1(5) disposed most upstream on the LED mounting; board 110(2) are electrically connected through wiring formed on the LED drive board 140.

<3.4 Effects>

According to the present embodiment, similarly to the first embodiment, all of the LEDs 1 provided as the light sources on the one end side and the other end side of the display unit 510 can be driven by only one system of DC-DC converter 11. Further, similarly to the second embodiment, the high-density mounting is performed on the LED mounting board 110. From trite above, when the configuration is adopted in which a plurality of LEDs 1 are provided on one end side and the other end side of the display unit 510 as the edge-light type backlight device, it is possible to realize reduction in size, thickness, and weight of the device as compared to the conventional one.

<3.5 Modification>

Similarly to the first modification of the second embodiment, it is possible to use the packaged switch 13P (see FIGS. 12 and 13) in which two switches 13 are packaged into one. Further, similarly to the second modification of the second embodiment, it is also possible to adopt the configuration of controlling the supply of the current to the two LEDs 1 by turning on/off one switch 13.

4. Fourth Embodiment

<4.1 Overview>

A fourth embodiment will be described. In the present embodiment, one (composite element) formed by packaging the LED 1 and the switch (the switch for controlling the supply of the current to the LED) 13 as one module is used. In the present specification, the module formed by packaging the LED 1 and the switch 13 as thus described is referred to as a "packaged LED module". Further, in the present embodiment, similarly to the second embodiment, the display unit 510 is logically divided into four areas and the edge-light system has been adopted in which the LEDs 1 as the light sources are provided only on the upper side of the display unit 510.

<4.2 Packaged LED Module>

Figure 23:
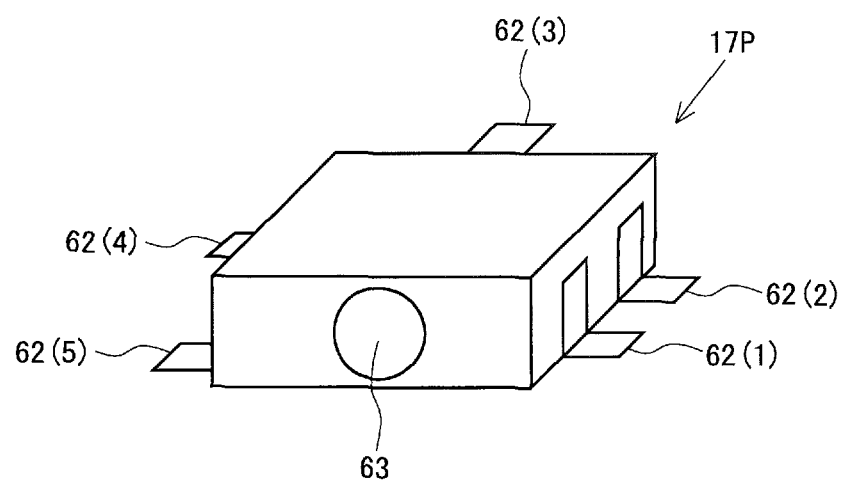
FIG. 23 is an external perspective view of a packaged LED module in a fourth embodiment.

FIG. 23 is an external perspective view of a packaged LED module 17P. This packaged LED module 17P has five terminals 62(1) to 62(5) and a light emitting surface 63. The LED 1 provided inside the packaged LED module 17P emits light in a direction horizontal to the board in a state where the packaged LED module 17P is mounted on the board. That is, the packaged LED module 17P is a side light-emitting type light emitting element.

Figure 24:
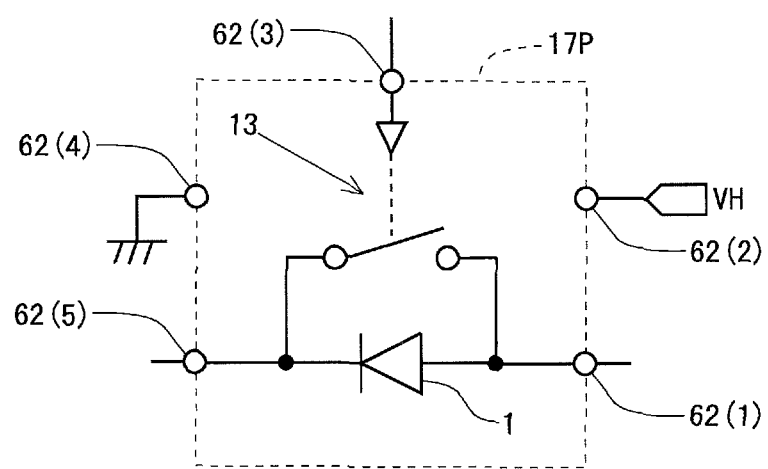
FIG. 24 is a diagram showing a detailed configuration of the inside of the packaged LED module in the fourth embodiment.

FIG. 24 is a diagram showing a detailed configuration of the inside of the packaged LED module 17P. The packaged LED module 17P includes, on the inside, the LED 1 as the light source and the switch 13 for controlling the supply of the current to the LED 1. The LED 1 and the switch 13 are connected in parallel. The terminal 62(1) is connected to the anode terminal of the LED 1, and the terminal 62(5) is connected to the cathode terminal of the LED 1. A control signal (a signal sent from the switch control unit 14) for controlling on/off of the switch 13 is applied to the terminal 62(3). Further, the power supply voltage VH, which is about 2 to 10 V higher than the output voltage DCDC_VOUT from the DC-DC converter 11, is applied to the terminal 62(2), and the reference voltage GND is applied to the terminal 62(4). The power supply voltage VH and the reference voltage GND are taken as voltages for operation of the switch 13.

Although the packaged LED module 17P with five terminals has been described here as an example, a packaged LED module 17P with six terminals can also be adopted. In this case, the sixth terminal can also be used as a terminal for error output when an error such as temperature abnormality occurs. Thus, when an abnormality occurs, it is possible to perform a process in response to the abnormality.

<4.3 Outline of Backlight Device>

Figure 25:
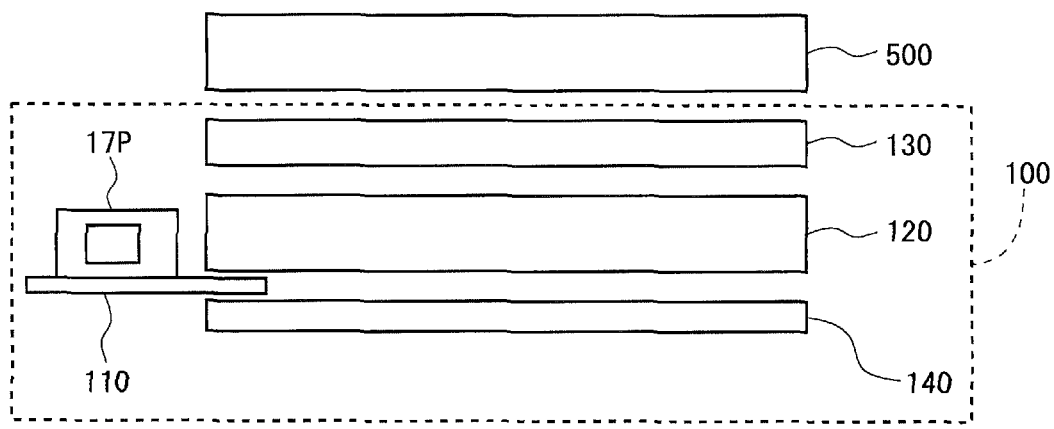
FIG. 25 is a schematic side view of a backlight device in the fourth embodiment.

FIG. 25 is a schematic side view of the backlight device 100 in the present embodiment. This backlight device 100 includes the above-described packaged LED module 17P, the LED mounting board 110 on which the packaged LED module 17P is placed, the light guide plate 120, the optical sheet 130, and the LED drive board 140. Similarly to the second embodiment, the LED mounting board 110 is provided only on one end side (upper side) of the display unit 510. Note that the height of the packaged LED module 17P is equal to or smaller than the thickness of the light incident portion of the light guide plate 120.

Figure 26:
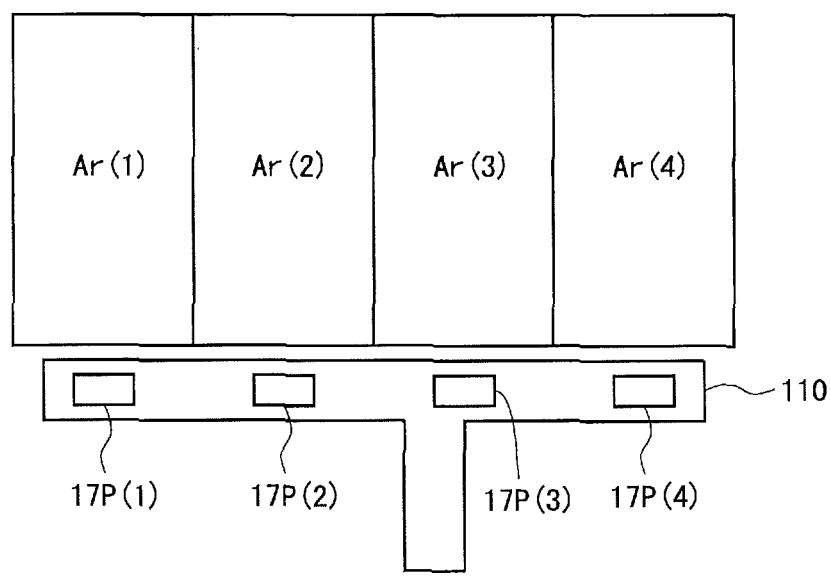
FIG. 26 is a plan view for explaining the arrangement of packaged LED modules in the fourth embodiment.

FIG. 26 is a plan view for explaining the arrangement of the packaged LED modules 17P. As described above, in the present embodiment, the display unit 510 is logically divided into four areas Ar(1) to Ar(4). Four packaged LED modules 17P(1) to 17P(4) corresponding to the four areas Ar(1) to Ar(4), respectively, are placed on the LED mounting board 110. The four packaged LED modules 17P(1) to 17P(4) are arranged substantially in alignment.

<4.4 Backlight Drive Circuit>

Figure 27:
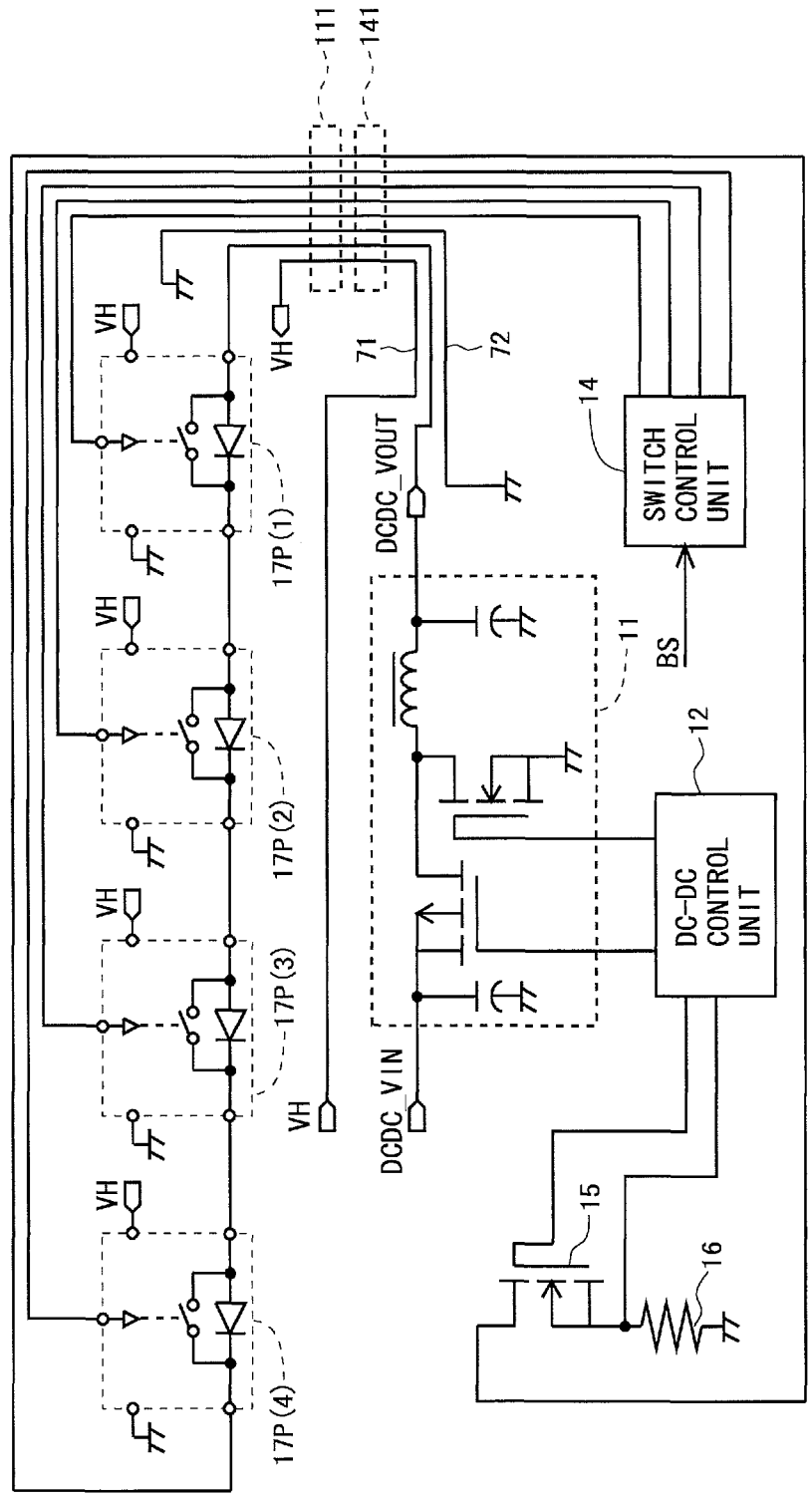
FIG. 27 is a circuit diagram showing a configuration of a backlight drive circuit in the fourth embodiment.

FIG. 27 is a circuit diagram showing a configuration of a backlight drive circuit in the present embodiment. The backlight drive circuit is constituted by the above-described four packaged LED modules 17P(1) to 17P(4), the DC-DC converter 11, the DC-DC control unit 12, the switch control unit 14, the FET 15, and the sense resistor 16. Each packaged LED module 17P includes the LED 1 and the switch 13 connected in parallel (see FIG. 24).

With respect to the constituent elements shown in FIG. 27, the packaged LED modules 17P(1) to 17P(4) are constituent elements provided on the LED mounting board 110, and the DC-DC converter 11, the DC-DC control unit 12, the switch control unit. 14, the FET 15, and the sense resistor 16 are constituent elements provided on the LED drive board 140.

Further, similarly to the second and third embodiments, the power supply voltage VH, which is about 2 to 10 V higher than the output voltage DCDC_VOUT from the DC-DC converter 11, and the reference voltage GND thereof are supplied from the LED drive board 140 to the LED mounting board 110 through the wires 71, 72, respectively.

In the configuration as described above, the switch control unit 14 controls on/off of the switch 13 included in packaged LED module 17P based on the light source control signal BS sent from the display control circuit 200 (see FIG. 1). Thus, the supply of the current is controlled for each LED 1, and the luminance is adjusted for each LED 1.

<4.5 Effects>

According to the present embodiment, the packaged LED module 17P formed by packaging the LED 1 and the switch (the switch for controlling the supply of the current to the LED) 13 as one module is used. Therefore, more remarkable high-density mounting can be performed on the LED mounting board 110. Further, since the height of the packaged. LED module 17P is equal to or smaller than the thickness of the light incident portion of the light guide plate 120, the thickness of the device can be reduced. From the above, in the case of adopting the configuration in which a plurality of LEDs 1 are provided on one end side of the display unit 510 as the edge-light type backlight device, it is possible to reduce the size, thickness, and weight of the device as compared to the second embodiment.

Moreover, since the LED 1 and the switch 13 are connected with a wire inside the packaged LED module 17P, the number of required parts is reduced and the wiring on the LED mounting board 110 is simplified. In addition, due to the possibility to perform remarkable high-density mounting as described above, the luminance can be increased by closely arranging the LEDs 1.

5. Fifth Embodiment

<5.1 Overview>

A fifth embodiment of the present invention will be described. The configuration of the backlight device 100 according to the present embodiment is a combination of the feature of the first embodiment and the feature of the fourth embodiment. That is, while the LED mounting board 110(1) disposed on the upper side of the display unit 510 and the LED mounting board 110(2) disposed on the lower side of the display unit 510 are provided in the backlight device 100, the cathode terminal of the LED disposed most downstream on the LED mounting board 110(1) and the anode terminal of the LED disposed most upstream on the LED mounting; board 110(2) are connected through the wiring on the LED drive board 140. Further, the packaged LED module 17P formed by packaging the LED 1 and the switch (the switch for controlling the supply of the current to the LED) 13 as one module is used. Note that the display unit 510 is logically divide into eight in the same manner as in the first embodiment.

<5.2 Outline of Backlight Device>

Figure 28:
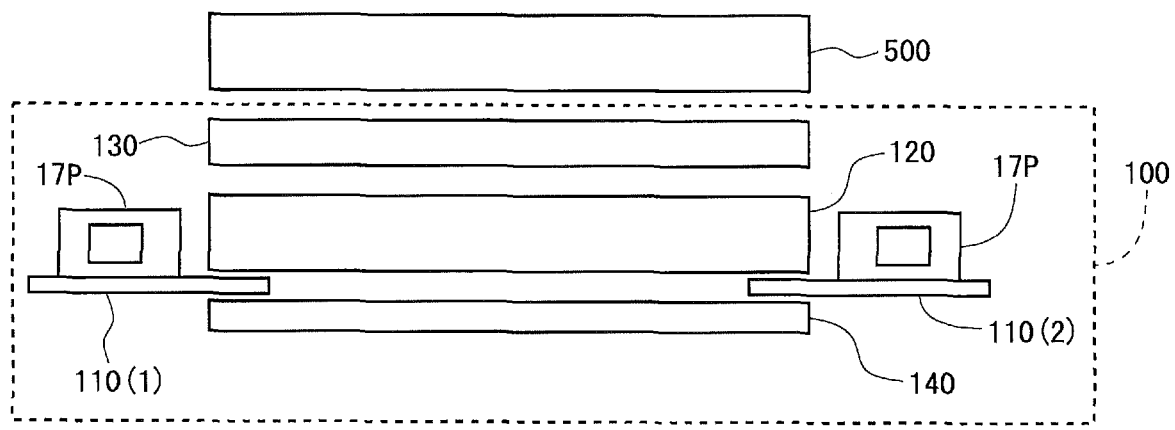
FIG. 28 is a schematic side view of a backlight device in a fifth embodiment.

FIG. 28 is a schematic side view of the backlight device 100 in the present embodiment. This backlight device 100 includes the above-described packaged LED module 17P, the LED mounting boards 110(1), 110(2) on each of which the packaged LED modules 17P are placed, the light guide plate 120, the optical sheet 130, and the LED drive board 140. As understood from FIG. 28, similarly to the first embodiment, the LED mounting board 110(1) is provided on the upper side of the display unit 510 and the LED mounting board 110(2) is provided on the lower side of the display unit 510. The packaged LED modules 17P are placed on each of the LED mounting board 110(1) and the LED mounting board. 110(2). That is, in the present embodiment, the edge-light system has been adopted in which the LEDs 1 as light sources are provided on the upper side and the lower side of the display unit 510.

Figure 29:
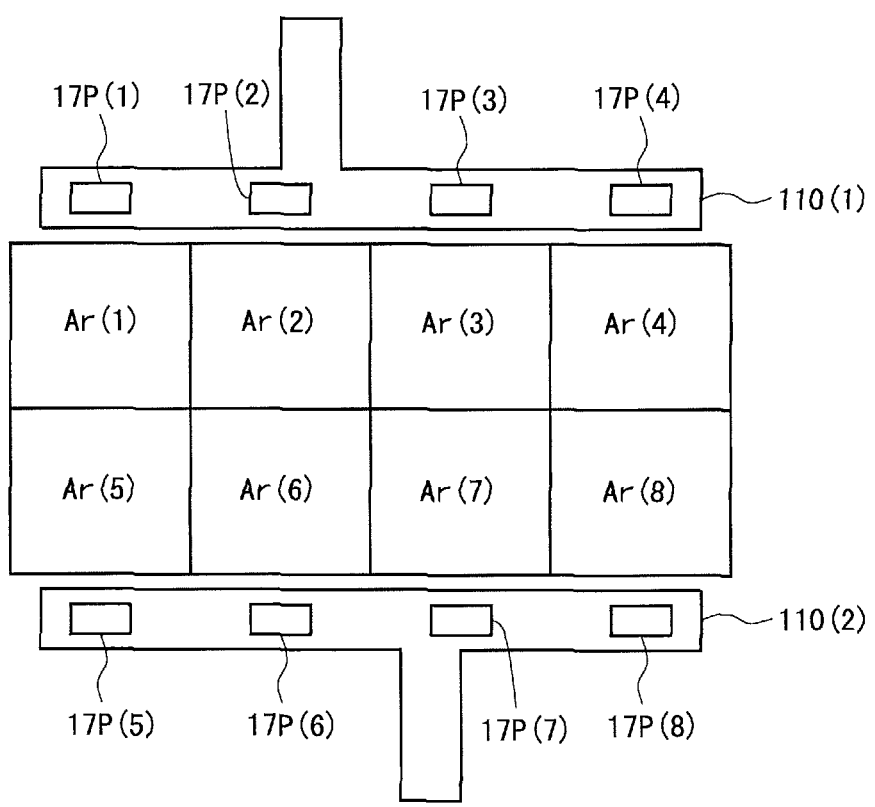
FIG. 29 is a plan view for explaining the arrangement of packaged LED modules in the fifth embodiment.

FIG. 29 is a plan view for explaining the arrangement of the packaged LED modules 17P. Four packaged. LED modules 17P(1) to 17P(4), which correspond to the four areas Ar(1) to Ar(4) in the upper half of the display unit 510, are placed on the LED mounting board 110(1). Four packaged LED modules 17P(5) to 17P(8), which correspond to the four areas Ar(5) to Ar(8) in the lower half of the display unit 510, are placed on the LED mounting board 110(2).

On each LED mounting board 110, similarly to the fourth embodiment, four packaged LED modules 17P are arranged substantially in alignment.

<5.3 Backlight Drive Circuit>

Figure 30:
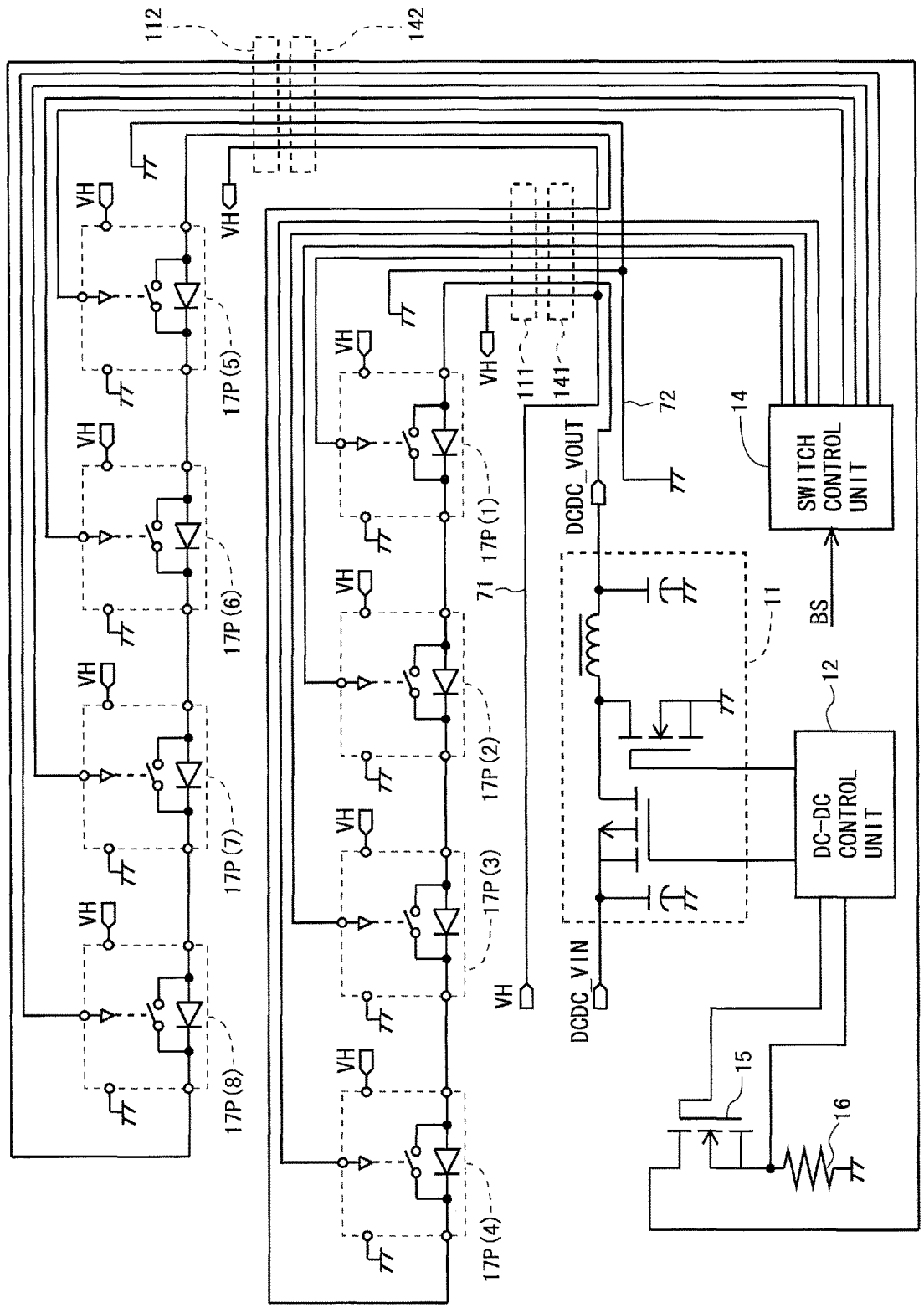
FIG. 30 is a circuit diagram showing a configuration of a backlight drive circuit in the fifth embodiment.
Figure 31:
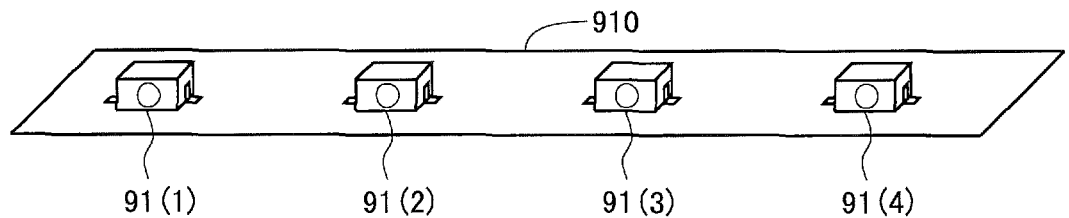
FIG. 31 is an example of a perspective view of an LED mounting board in a conventional example.
Figure 32:
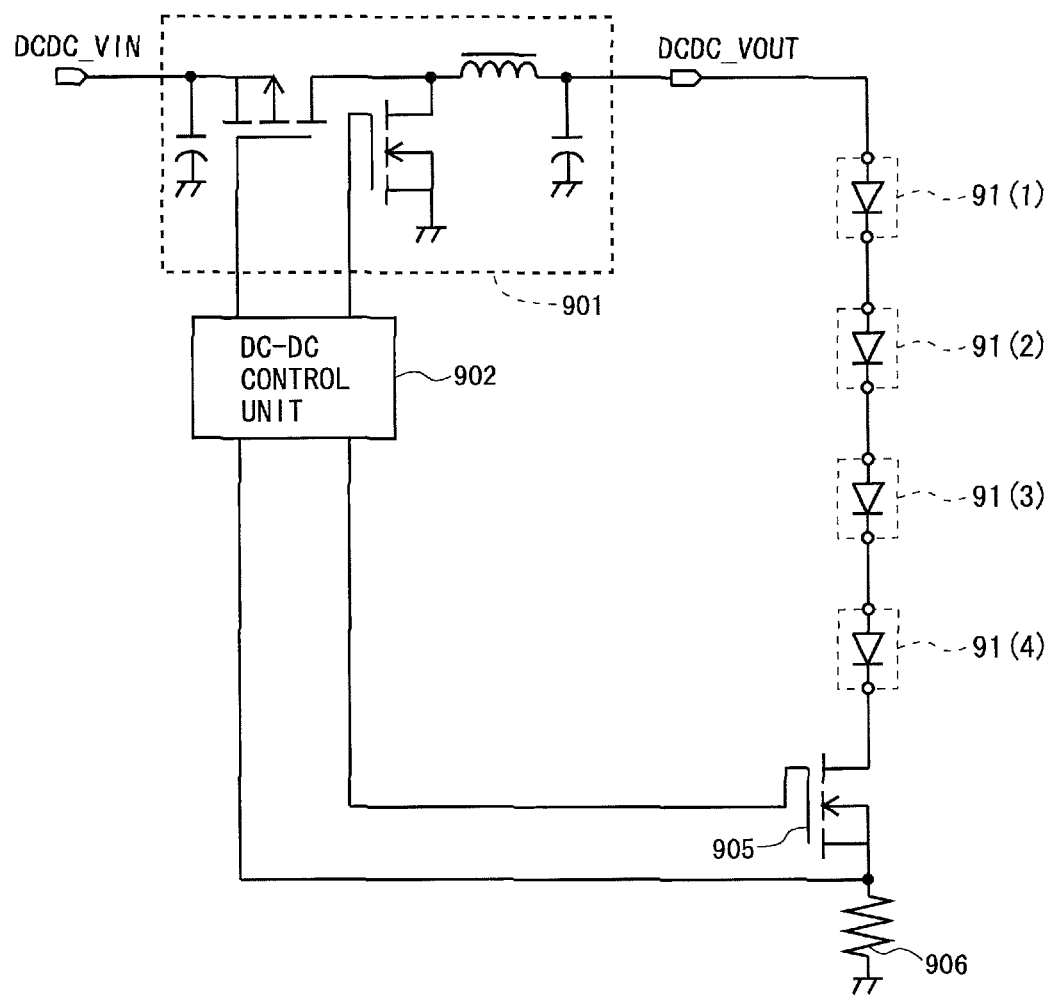
FIG. 32 is a circuit diagram showing a configuration of a backlight drive circuit in a first conventional example.
Figure 33:
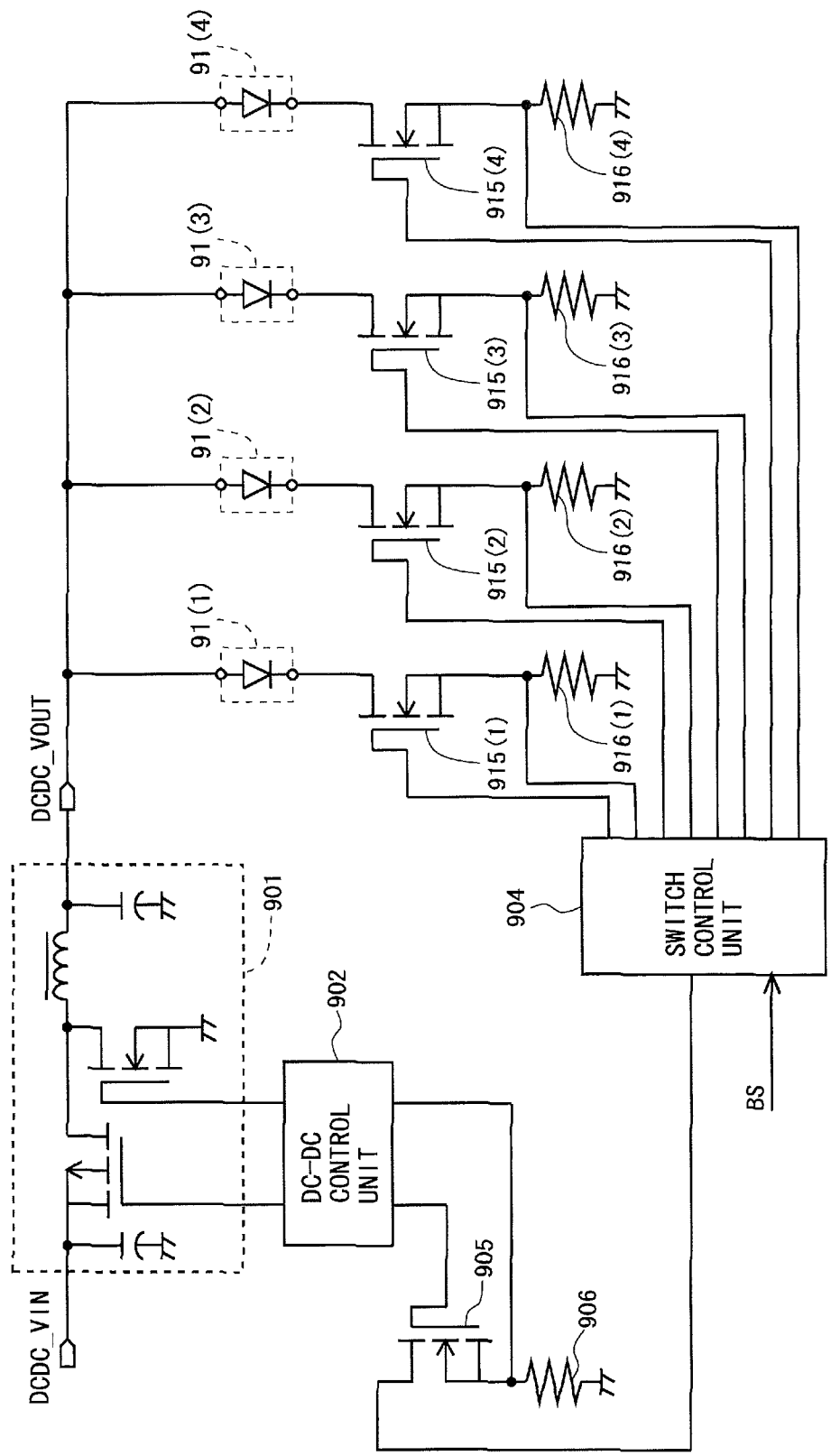
FIG. 33 is a circuit diagram showing a configuration of a backlight drive circuit in a second conventional example.
Figure 34:
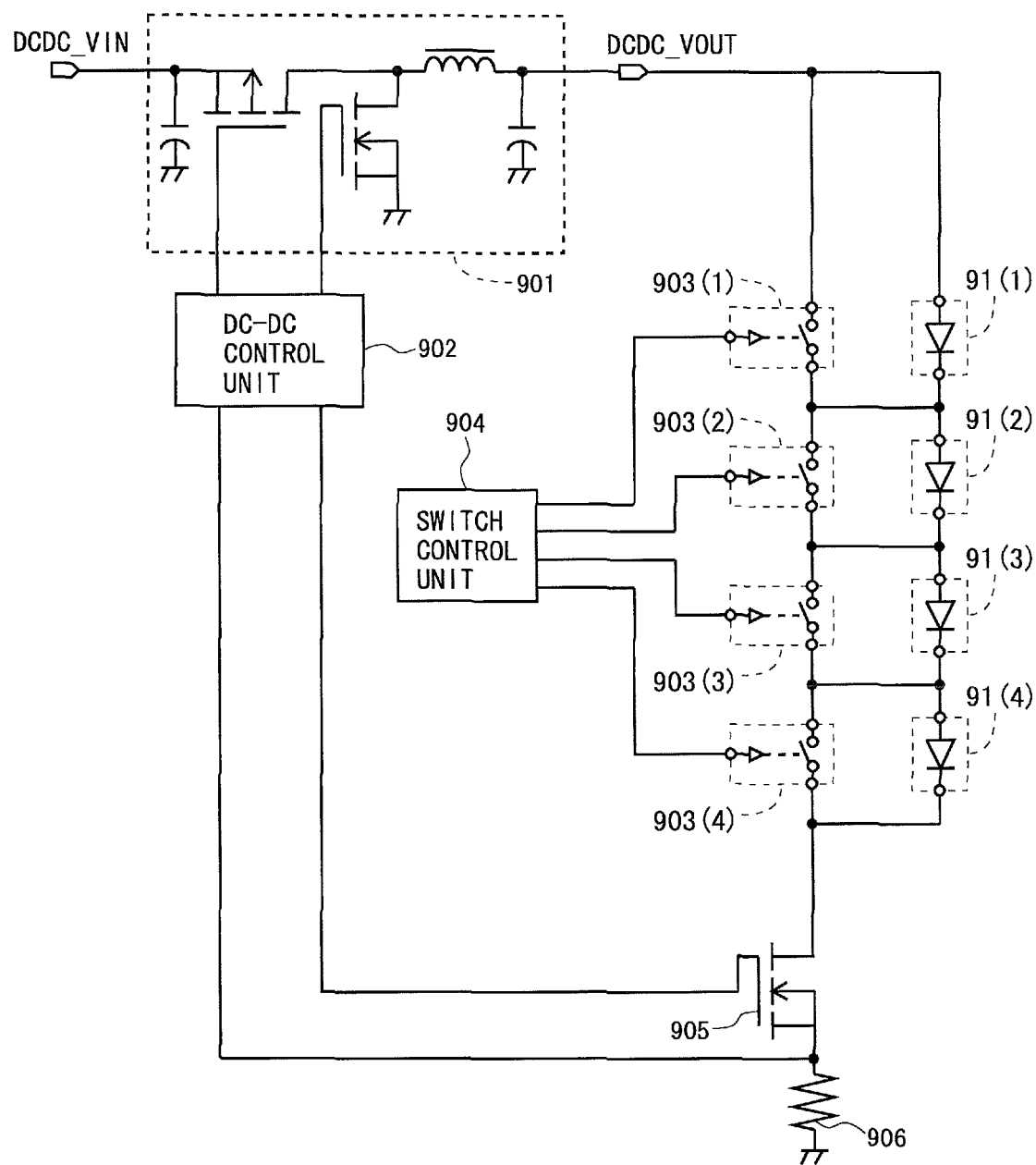
FIG. 34 is a circuit diagram showing a configuration of a backlight drive circuit in a third conventional example.

FIG. 30 is a circuit diagram showing the configuration of the backlight drive circuit in the present embodiment. The backlight drive circuit is constituted by eight packaged LED modules 17P(1) to 17P(8), the DC-DC converter 11, the DC-DC control unit 12, the switch control unit 14, the FET 15, and the sense resistor 16.

With respect to the constituent elements shown in FIG. 30, the packaged LED modules 17P(1) to 17P(4) are constituent elements provided on the LED mounting board 110(1), the packaged LED modules 17P(5) to 17P(8) are constituent elements provided on the LED mounting board 110(2), and the DC-DC converter 11, the DC-DC control unit 12, the switch control unit 14, the FET 15, and the sense resistor 16 are constituent elements provided on the LED drive board 140.

Similarly to the second to fourth embodiments, the power supply voltage VH, which is about 2 to 10 V higher than the output voltage DCDC_VOUT from the DC-DC converter 11, and the reference voltage GND thereof are supplied from the LED drive board 140 to the LED mounting boards 110(1), 110(2) through the wires 71, 72, respectively.

Here, as understood from FIG. 30, the cathode terminal of the LED 1 in the packaged LED module 17P(4) disposed most downstream on the LED mounting board 110(1) (see FIG. 24) and the anode terminal of the LED 1 in the packaged LED module 17P(5) disposed most upstream on the LED mounting board 110(2) (see FIG. 24) are electrically connected through the wiring formed on the LED drive board 140.

<5.4 Effects>

According to the present embodiment, similarly to the first embodiment, all of the LEDs 1 (the LEDs 1 in the packaged LED modules 17P) provided as the light sources on the one end side and the other end side of the display unit 510 can be driven by only one system of DC-DC converter 11. Further, similarly to the fourth embodiment, more remarkable high-density mounting can be performed on the LED mounting board 110. From the above, when the configuration is adopted in which a plurality of LEDs 1 are provided on one end side and the other end side of the display unit 510 as the edge-light type backlight device, it is possible to realize remarkable reduction in size, thickness, and weight of the device.

6. Others

Although the example in which the backlight device is used for the liquid crystal di play device has been described in each of the above embodiments, the same configuration can be adopted in a case in which the backlight device is used for a display device other than the liquid crystal display device.

This application claims priority to Japanese Patent Application No. 2016-214246, entitled "Backlight device, and display device provided with same", filed on Nov. 1, 2016, the content of which is incorporated herein by reference.

DESCRIPTION OF REFERENCE CHARACTERS

1, 1(1) to 1(8): LED
10: Light source drive unit
11: DC-DC converter
12: DC-DC control unit
13, 13(1) to 13(8): Switch
13P, 13P(1), 13P(2): Packaged switch
17P, 17P(1) to 17P(8): Packaged LED module
14: Switch control unit
19: Light source unit
110, 110(1), 110(2): LED mounting board
120: Light guide plate
130: Optical sheet
140: LED drive board
100: Backlight device
500: Liquid crystal panel
510: Display unit
Ar(1) to Ar(8): Area

The invention claimed is:

1. An edge-light type backlight device, comprising:
   a light guide plate;
   a first LED group that is a plurality of LEDs connected in series;
   a second LED group that is a plurality of LEDs connected in series;
   switches each being connected in parallel with a corresponding LED;
   a first LED mounting board which is disposed on one end side of the light guide plate and on which the first LED group is placed;
   a second LED mounting board disposed on the other end side of the light guide plate and on which the second LED group is placed; and
   an LED drive board on which a circuit for driving the first LED group and the second LED group is formed;
   wherein control of supply of a current to each of the LEDs is performed by controlling on/off of a corresponding switch, and a cathode terminal of a LED disposed most downstream in the first LED group and an anode terminal of a LED disposed most upstream of the second LED group are electrically connected to each other through wiring on the LED drive board.

2. The backlight device according to claim 1, wherein the switches are placed on the first LED mounting board and the second LED mounting board.

3. The backlight device according to claim 2, wherein
each of the switches is provided so as to correspond to one LED, and
the LEDs and the switches are alternately arranged in the first LED mounting board and the second LED mounting board.

4. The backlight device according to claim 2, wherein
a packaged switch in which two switches are integrally formed is used, and
the packaged switch is disposed in a region between the LED corresponding to one of the two switches and the LED corresponding to the other of the two switches.

5. The backlight device according to claim 4, wherein a height of the packaged switch is equal to or smaller than a thickness of a light incident portion of the light guide plate.

6. The backlight device according to claim 2, wherein each of the switches is connected in parallel with two adjacent LEDs.

7. The backlight device according to claim 2, wherein a height of each of the LEDs and a height of each of the switches are equal to or smaller than a thickness of the light incident portion of the light guide plate.

8. The backlight device according to claim 1, wherein each of the LEDs is integrally formed with a corresponding switch, as a composite element.

9. The backlight device according to claim 8, wherein a height of the composite element is equal to or smaller than a thickness of a light incident portion of the light guide plate.

10. The backlight device according to claim 8, wherein the composite element includes
a terminal connected to the anode terminal of a LED constituting the composite element,
a terminal connected to the cathode terminal of the LED constituting the composite element,
a terminal configured to receive a control signal that controls on/off of a switch constituting the composite element,
a terminal configured to receive a high-level voltage for operation of the switch constituting the composite element, and
a terminal configured to receive a low-level voltage for operation of the switch constituting the composite element.

11. The backlight device according to claim 10, wherein the composite element further includes a terminal for error output.

12. The backlight device according to claim 1, wherein each of the LEDs is a side light-emitting type that emits light in a direction horizontal to a surface of the board on which the relevant LED is placed.

13. The backlight device according to claim 1, wherein only one DC-DC converter is provided, the converter converting a direct-current input voltage into a direct-current voltage for driving the first LED group and the second LED group.

14. A display device comprising:
a display panel including a display unit configured to display an image; and
the backlight device according to claim 1, disposed on a back surface of the display panel.

* * * * *